United States Patent
Aamer et al.

(10) Patent No.: US 9,724,650 B2
(45) Date of Patent: Aug. 8, 2017

(54) HYDROPHILICALLY MODIFIED FLUORINATED MEMBRANE (II)

(71) Applicant: PALL CORPORATION, Port Washington, NY (US)

(72) Inventors: Khaled Abdel-Hakim Helmy Aamer, Port Washington, NY (US); Jian Qiu, Oakland Gardens, NY (US); Hassan Ait-Haddou, Melville, NY (US)

(73) Assignee: Pall Corporation, Port Washington, NY (US)

( * ) Notice: Subject to any disclaimer, the term of this patent is extended or adjusted under 35 U.S.C. 154(b) by 283 days.

(21) Appl. No.: 14/675,547

(22) Filed: Mar. 31, 2015

(65) Prior Publication Data

US 2016/0288059 A1 Oct. 6, 2016

(51) Int. Cl.
*B01D 71/80* (2006.01)
*B01D 71/62* (2006.01)
(Continued)

(52) U.S. Cl.
CPC ....... *B01D 69/125* (2013.01); *B01D 67/0006* (2013.01); *B01D 67/0088* (2013.01);
(Continued)

(58) Field of Classification Search
None
See application file for complete search history.

(56) References Cited

U.S. PATENT DOCUMENTS 4,136,237 A 1/1979 Takahashi et al.
4,975,507 A 12/1990 Asrar
(Continued)

FOREIGN PATENT DOCUMENTS

CN 1949574 A 4/2007
CN 101970509 A 2/2011
(Continued)

OTHER PUBLICATIONS

European Patent Office, Extended European Search Report issued in European Application No. 15192304.2, 5 pp. (Sep. 5, 2016).
(Continued)

*Primary Examiner* — Krishnan S Menon
(74) *Attorney, Agent, or Firm* — Leydig, Voit & Mayer, Ltd.

(57) ABSTRACT

Disclosed are copolymers which are useful in hydrophilically modifying porous fluoropolymer supports. An example of the copolymers is:

(Continued)

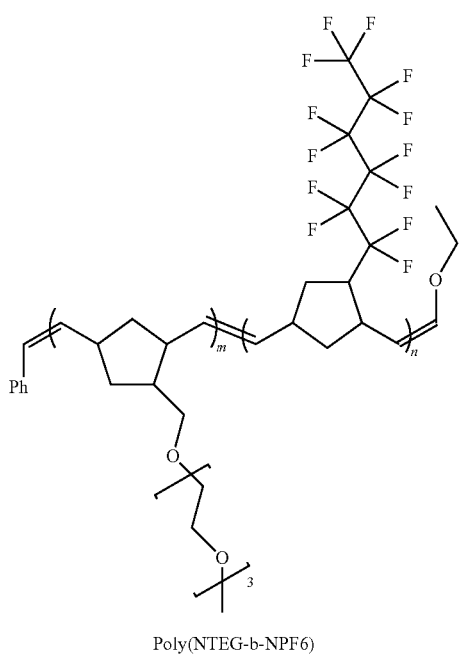

Poly(NTEG-b-NPF6)

Also disclosed are a method of preparing such copolymers, a method of modifying porous fluoropolymer surfaces, and hydrophilic fluoropolymer porous membranes prepared therefrom. Also disclosed is a method of filtering fluids by the use of the hydrophilic fluoropolymer porous membranes.

17 Claims, 4 Drawing Sheets

(51) Int. Cl.
| | |
|---|---|
| B01D 71/32 | (2006.01) |
| B01D 69/12 | (2006.01) |
| B01D 67/00 | (2006.01) |
| C08J 7/04 | (2006.01) |
| B01D 69/10 | (2006.01) |
| B01D 71/44 | (2006.01) |

(52) U.S. Cl.
CPC ......... B01D 67/0095 (2013.01); B01D 69/10 (2013.01); B01D 71/44 (2013.01); B01D 71/80 (2013.01); C08J 7/047 (2013.01); B01D 2323/02 (2013.01); B01D 2323/30 (2013.01); B01D 2325/36 (2013.01); B01D 2325/42 (2013.01); C08J 2327/18 (2013.01); C08J 2427/12 (2013.01)

(56) References Cited

U.S. PATENT DOCUMENTS

| | | | |
|---|---|---|---|
| 5,117,327 A | 5/1992 | Asrar et al. | |
| 5,200,470 A | 4/1993 | Asrar | |
| 5,219,662 A | 6/1993 | Grimminger et al. | |
| 5,294,493 A | 3/1994 | Beckerbauer et al. | |
| 5,418,277 A | 5/1995 | Ma et al. | |
| 6,080,826 A | 6/2000 | Grubbs et al. | |
| 6,126,825 A | 10/2000 | Shinagawa et al. | |
| 6,303,725 B1 | 10/2001 | Chang et al. | |
| 6,313,222 B1 | 11/2001 | Lin et al. | |
| 6,436,476 B1 | 8/2002 | Sage, Jr. | |
| 6,492,443 B1 | 12/2002 | Kodemura et al. | |
| 6,653,424 B1 | 11/2003 | Sakamoto et al. | |
| 6,677,418 B1 | 1/2004 | Feast et al. | |
| 6,987,154 B2 | 1/2006 | Choi et al. | |
| 7,232,917 B2 | 6/2007 | Sumida et al. | |
| 7,514,499 B2 | 4/2009 | Tam et al. | |
| 8,143,369 B2 | 3/2012 | Fujiwara et al. | |
| 8,223,472 B1 | 7/2012 | Dirk et al. | |
| 8,283,410 B2 | 10/2012 | Musa | |
| 8,410,290 B2 | 4/2013 | Fujiwara et al. | |
| 8,431,625 B2 | 4/2013 | Luchterhandt et al. | |
| 8,678,203 B2 | 3/2014 | Knapp et al. | |
| 8,883,925 B2 | 11/2014 | Kizu et al. | |
| 9,169,361 B1 | 10/2015 | Aamer | |
| 9,441,078 B2* | 9/2016 | Aamer | C08G 81/00 |
| 2004/0067402 A1 | 4/2004 | Bahar et al. | |
| 2006/0205301 A1 | 9/2006 | Klare et al. | |
| 2007/0102349 A1 | 5/2007 | Duong et al. | |
| 2008/0234451 A1 | 9/2008 | Kenwright et al. | |
| 2009/0023877 A1 | 1/2009 | Liaw et al. | |
| 2009/0030175 A1 | 1/2009 | Yamamoto et al. | |
| 2009/0043059 A1 | 2/2009 | Liaw et al. | |
| 2009/0182117 A1 | 7/2009 | Takeyama et al. | |
| 2009/0264608 A1 | 10/2009 | Wakatsuki et al. | |
| 2009/0269601 A1 | 10/2009 | Ishiguro et al. | |
| 2009/0275719 A1 | 11/2009 | Ishiguro et al. | |
| 2010/0087659 A1 | 4/2010 | Liaw et al. | |
| 2011/0266220 A1 | 11/2011 | Campos et al. | |
| 2012/0041137 A1 | 2/2012 | Musa et al. | |
| 2012/0214940 A1 | 8/2012 | Hsu et al. | |
| 2012/0245271 A1 | 9/2012 | Pawlow et al. | |
| 2013/0108845 A1 | 5/2013 | Tee et al. | |
| 2013/0281644 A1 | 10/2013 | Kiessling et al. | |
| 2013/0292872 A1 | 11/2013 | Knapp et al. | |
| 2014/0042090 A1* | 2/2014 | Bell | B01D 67/0009 210/640 |
| 2014/0061122 A1 | 3/2014 | Ogura et al. | |
| 2014/0357820 A1 | 12/2014 | Stephen et al. | |

FOREIGN PATENT DOCUMENTS

| | | |
|---|---|---|
| CN | 102423642 A | 4/2012 |
| EP | 0456939 A1 | 11/1991 |
| EP | 0526823 A1 | 2/1993 |
| EP | 0579852 A1 | 1/1994 |
| EP | 0922486 A1 | 6/1999 |
| TW | 201434528 A | 9/2014 |
| WO | WO 93/15255 | 8/1993 |
| WO | WO 00/43112 A1 | 7/2000 |
| WO | WO 2004/041397 A2 | 5/2004 |
| WO | WO 2009/097322 A1 | 8/2009 |
| WO | WO 2014/208592 A1 | 12/2014 |

OTHER PUBLICATIONS

Intellectual Property Office of Singapore, Search Report issued in Singapore Application No. 10201508869V, 7 pp. (Feb. 9, 2016).
Taiwan Intellectual Property Office, Examination Report issued in Taiwanese Application No. 104135573 (Sep. 13, 2016) 5 pp.
Korean Intellectual Property Office, Notice of Non-Final Rejection issued in Korean Application No. 10-2015-0151710 (Apr. 19, 2017) 7 pp.

* cited by examiner

HYDROPHILICALLY MODIFIED FLUORINATED MEMBRANE (II)

BACKGROUND OF THE INVENTION

The properties of fluoropolymer membranes, for example, porous PTFE membrane, including their mechanical strength, chemical resistance or inertness, non-adhesiveness, excellent dielectric property, thermal stability at high temperature and low coefficient of friction make them very attractive for various applications. However, for certain applications, it will be beneficial to modify the surface of PTFE without affecting its intrinsic properties. Efforts have been made to modify the surface and the chemical properties of PTFE membrane in order to improve the suitability of the membrane for specific applications. For example, efforts have included surface coating, blending, high energy surface modification, for example, broad band ultraviolet radiation or BBUV, where the membrane is exposed to a UV radiation of wavelength 250-450 nm, and plasma treatment, free radical, and ozone etching, atomic layer deposition, and synthesis of modified PTFE-like polymers. However, most of the efforts were focused on high energy treatment such as BBUV and plasma. Though the exact mechanism of these surface modification approaches is not reported, it likely results from the formation of free radicals by bond scission since C—C bond strength is known to be ~40% lower than F—F bond. If the majority of the radical results from C—C scission or main polymer chain scission, it could decrease the mechanical and the chemical stability of the PTFE membrane. It is also known that plasma treatment is limited to the surface of the membrane which makes it less stable during a long period of time.

The foregoing shows that there exists an unmet need for a surface modification of porous fluoropolymer membranes or supports to provide hydrophilic fluoropolymer porous membranes which are stable, and wherein the surface modification does not significantly affect the mechanical strength of the porous fluoropolymer supports or the resulting composite porous membranes.

BRIEF SUMMARY OF THE INVENTION

The invention provides a composite hydrophilic porous membrane comprising a porous fluoropolymer support and a coating comprising a copolymer, wherein the copolymer comprises repeat units A and B, wherein A is of the formula:

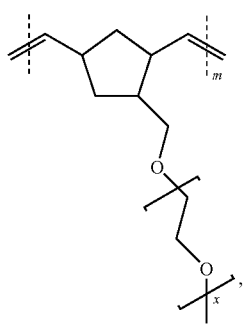

and B is of the formula

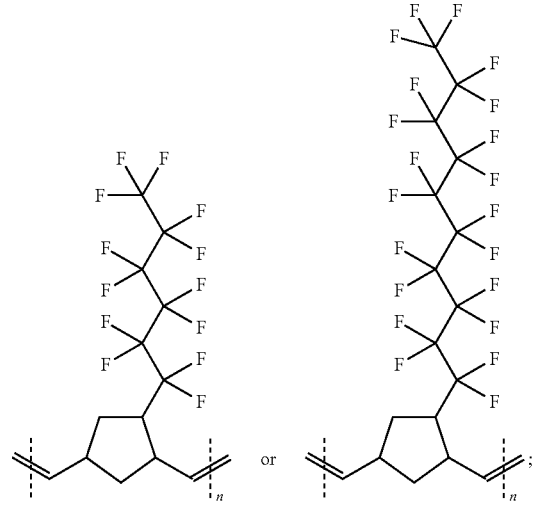

wherein:
the copolymer is a block copolymer or a random copolymer; x is 3 to about 10;
n and m, the number of repeat units A and B present in the copolymer, range from 1 to about 1000, provided the sum of n and m is equal to or greater than 10,
wherein the copolymer is optionally crosslinked.

The invention also provides copolymers having ion-exchange or chelating functionalities.

The copolymers of the invention are useful in modifying the surface of porous fluoropolymer membranes or supports.

The present invention further provides methods of preparing the copolymers and methods of preparing hydrophilically modified fluoropolymer porous membranes.

BRIEF DESCRIPTION OF THE SEVERAL VIEWS OF THE DRAWING(S)

DETAILED DESCRIPTION OF THE INVENTION

Figure 1:
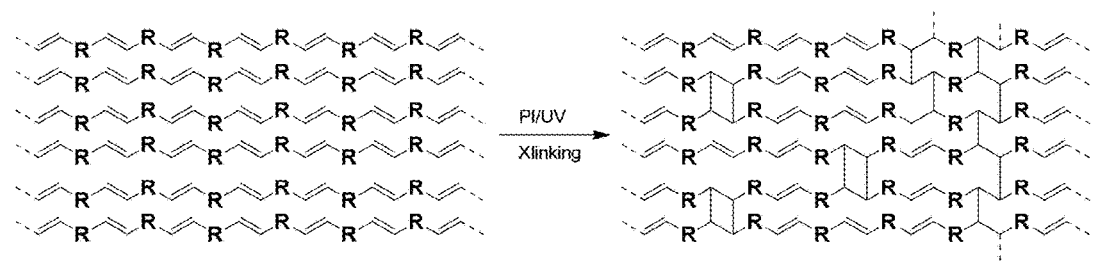
FIG. 1 illustrates a proposed crosslinked structure of a hydrophilic porous membrane of an embodiment of the invention.

In accordance with an embodiment, the invention provides a composite hydrophilic porous membrane comprising a porous fluoropolymer support and a coating comprising a copolymer, wherein the copolymer comprises repeat units A and B, wherein A is of the formula:

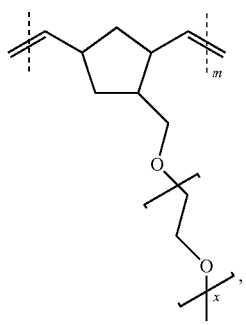

and B is of the formula

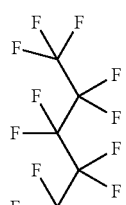 or 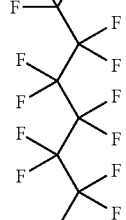;

wherein:

the copolymer is a block copolymer or a random copolymer;

x is 3 to about 10;

n and m, the number of repeat units A and B present in the copolymer, range from 1 to about 1000, provided the sum of n and m is equal to or greater than 10, wherein the copolymer is optionally crosslinked.

In the formulas herein, dotted lines on the formulas of the repeat units indicate that the copolymer can be a block copolymer or a random copolymer. Block copolymer are indicated by parentheses: (repeat unit). Random copolymers are indicated by square brackets: [repeat unit].

In embodiments, n and m represent the degrees of polymerization of the respective monomers, and are independently from about 10 to about 1000, preferably from about 20 to about 50.

In other embodiments, n and m represent the mole fraction of the monomers present in the copolymer, and n and m can independently range between 1 to 99 mole %, preferably 20 to 50 mole %.

In accordance with an embodiment, the copolymer of the invention has one of the following formulae:

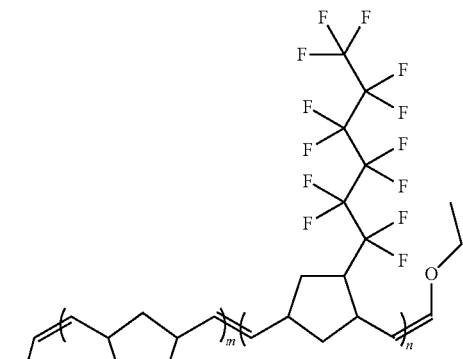

Poly(NTEG-b-NPF6)

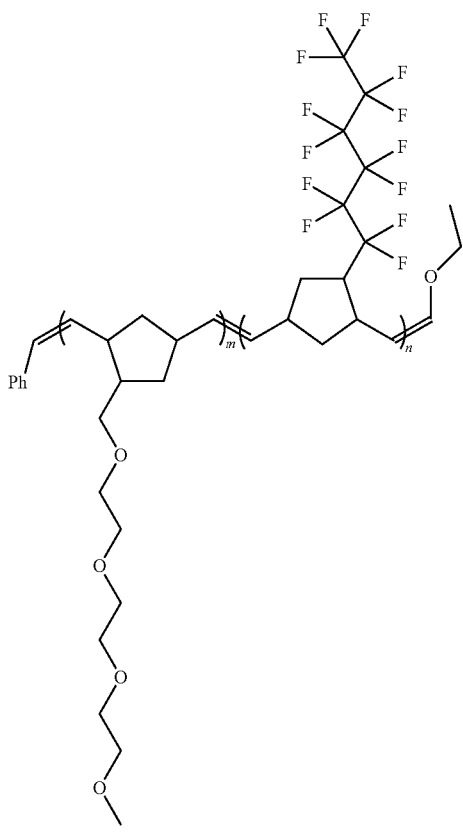

Poly(NTEG-r-NPF6)

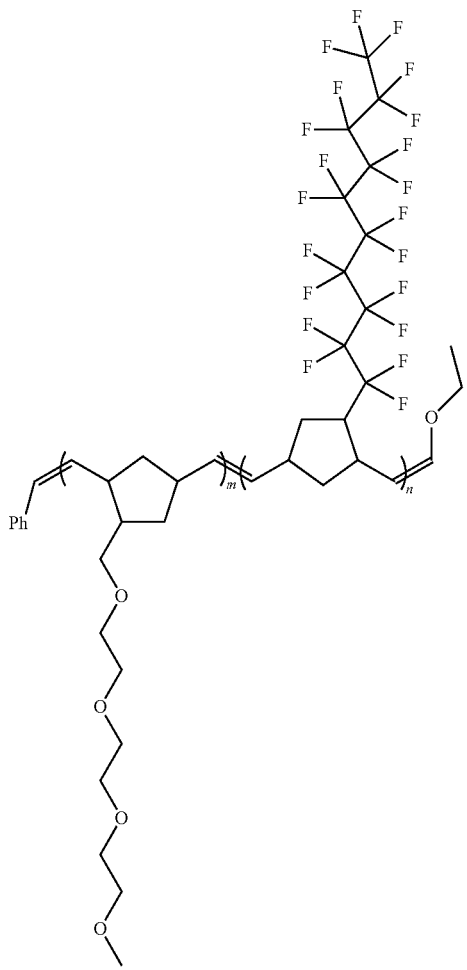

Poly(NTEG-b-NPF10)

In an embodiment, the present invention further provides a composite hydrophilic porous membrane comprising a porous fluoropolymer support and a coating comprising a copolymer, wherein the copolymer comprises repeat units A and B and one or more chelating or ion-exchange functionalities attached to one or more repeat units A, wherein A is of the formula:

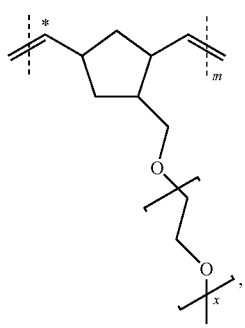

and B is of the formula

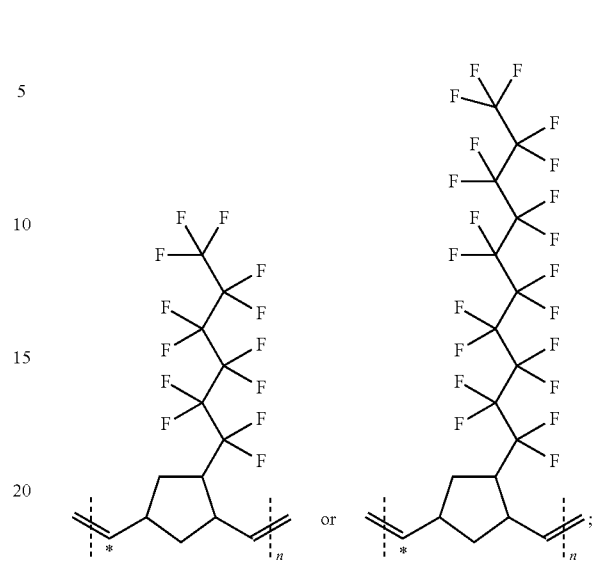

wherein: * is the point of attachment of the chelating or ion-exchange functionality; the copolymer is a block copolymer or a random copolymer; x is 3 to about 10; n and m, the number of repeat units A and B present in the copolymer, range from 1 to about 1000, provided the sum of n and m is equal to or greater than 10, wherein the copolymer is optionally crosslinked.

In an embodiment, the chelating or the ion-exchange functionality is selected from carboxy alkylthio, sulfonic alkylthio, and glyceryl thio groups, and combinations thereof.

Examples of copolymers of the above embodiment include:

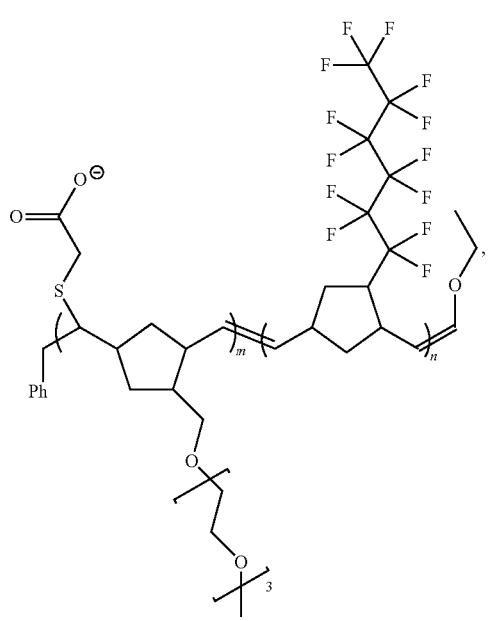

Poly(NTEG-b-NPF6)/MAcOH

-continued

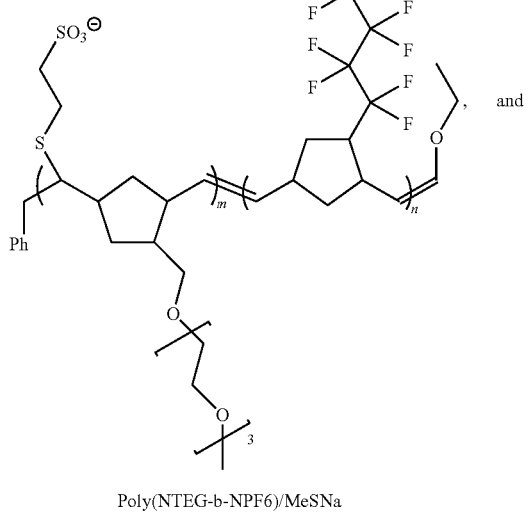

Poly(NTEG-b-NPF6)/MeSNa

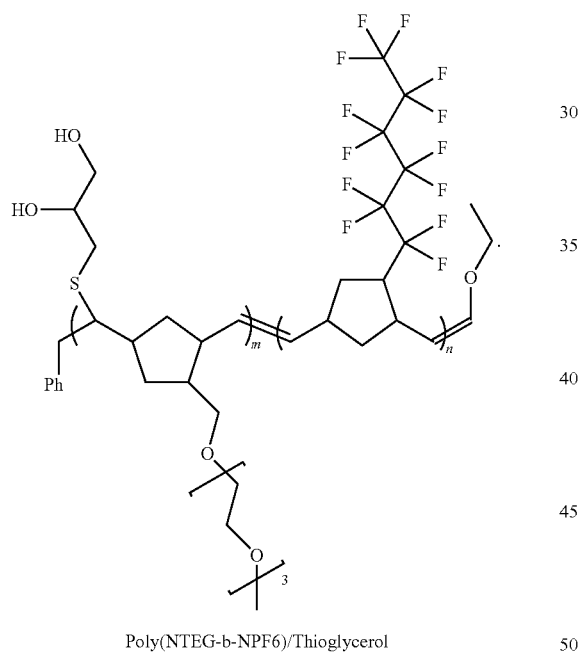

Poly(NTEG-b-NPF6)/Thioglycerol

The copolymers of the invention could be a block copolymer or a random copolymer. The block copolymer could be a diblock (A-B), triblock (A-B-A or B-A-B), or multi-block copolymer ((A-B)x). Optionally, the copolymer can have a third segment C, for example, a triblock copolymer or a random copolymer such as A-B-C.

The copolymer can be of any suitable molecular weight, for example, in an embodiment, a number or weight (Mn or Mw) average molecular weight from about 10 kDa to about 1000 kDa, preferably from about 75 kDa to about 500 kDa, and more preferably from about 250 kDa to about 500 kDa.

The respective monomer blocks can be present in the block copolymer in any suitable mass %, for example, in an embodiment, from about 99%: about 1% to about 50%: about 50%, preferably from about 90%: about 10% to about 70%: about 30%, and more preferably from about 75%: about 25%.

The copolymers of the invention can be prepared by any suitable method, for example, through ring opening metathesis polymerization of cyclic monomers. Typically a transition metal catalyst containing a carbene ligand mediates the metathesis reaction.

Any suitable ROMP catalyst can be used, for example, Grubbs' first, second, and third generation catalysts, Umicore, Hoveyda-Grubbs, Schrock, and Schrock-Hoveyda catalysts can be employed. Examples of such catalysts include the following:

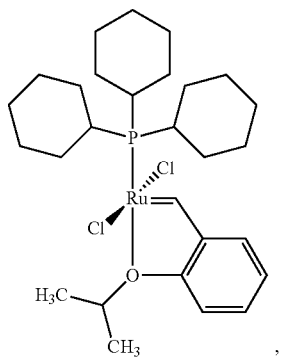

,

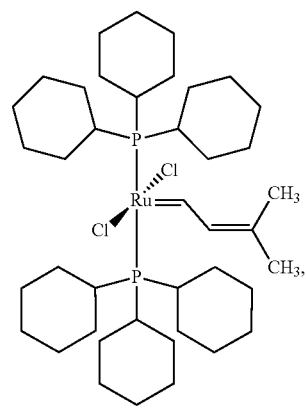

,

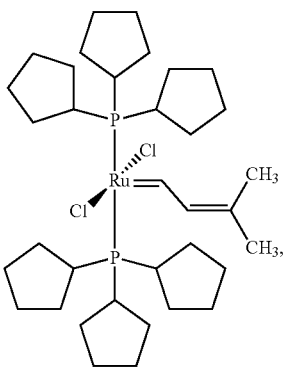

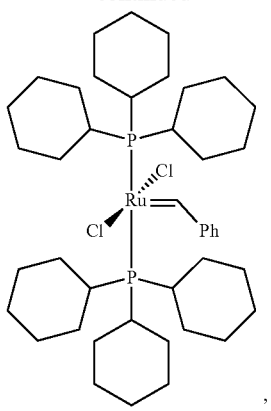
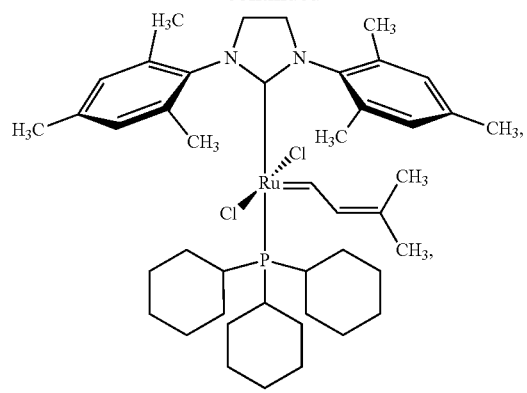
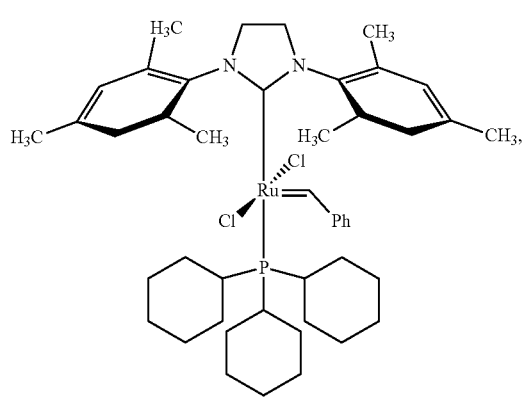
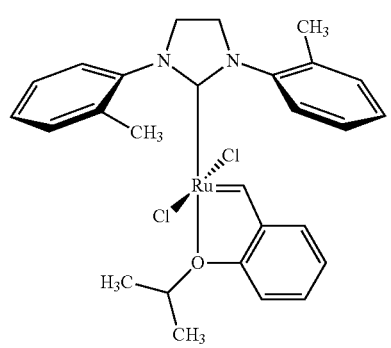
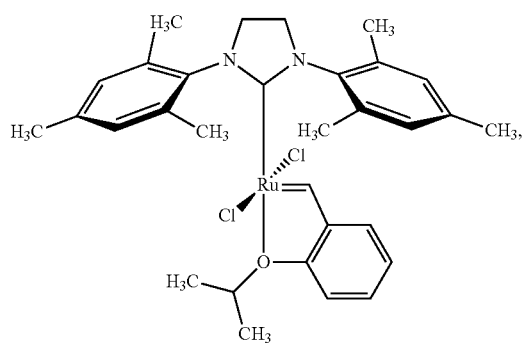
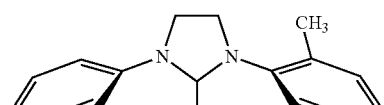
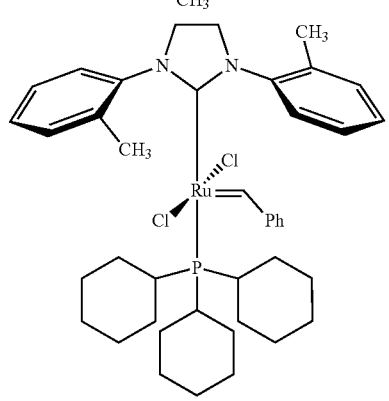
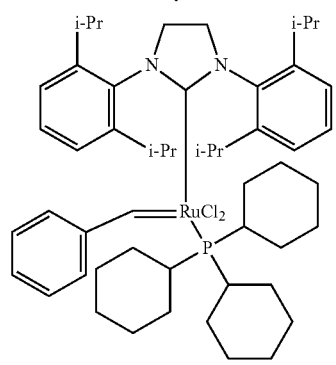

-continued

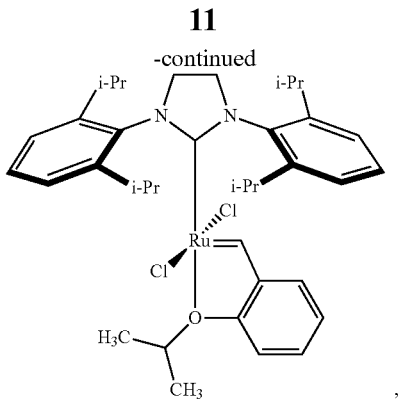

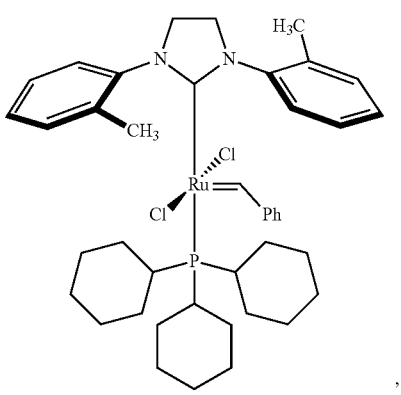

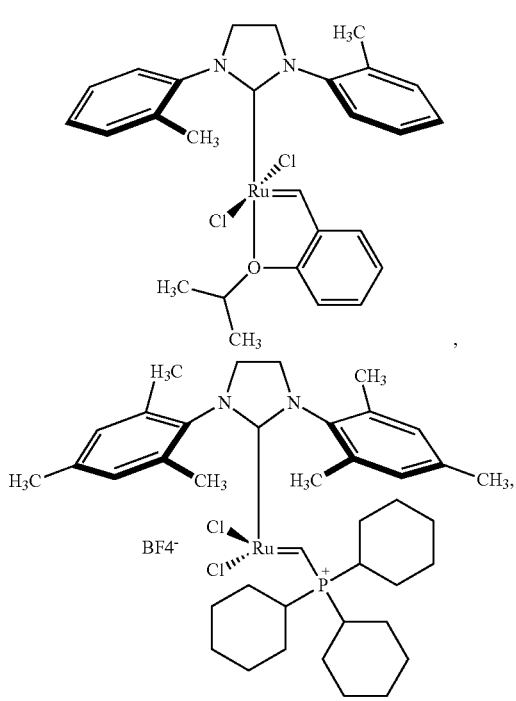

-continued

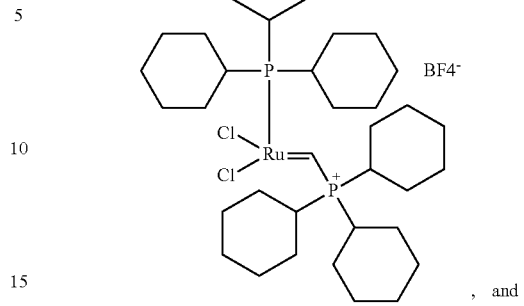

, and

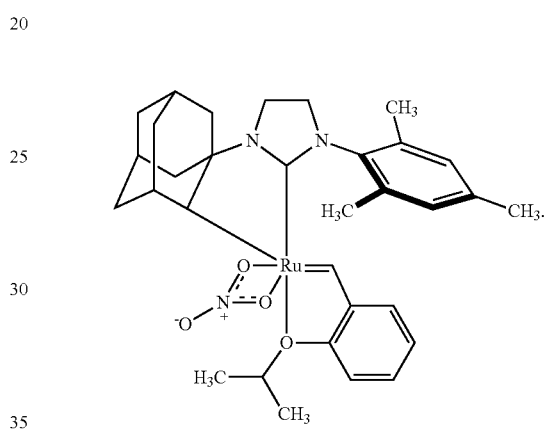

In an embodiment, Grubbs' third generation catalysts are particularly suitable due to their advantages such as stability in air, tolerance to multiple functional groups, and/or fast polymerization initiation and propagation rates. In addition, with the Grubbs' third generation catalysts, the end groups can be engineered to accommodate any compatible groups, and the catalyst can be recycled readily. A preferred example of such a catalyst is:

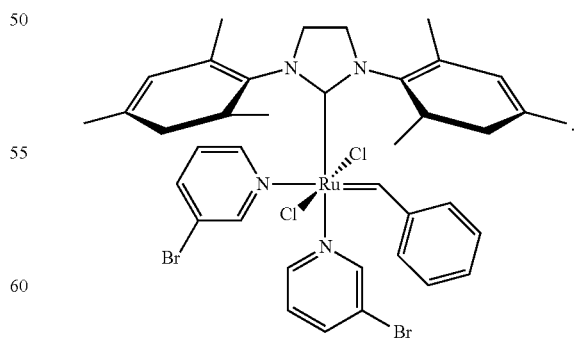

The above third generation Grubbs catalyst (G3) may be obtained commercially or prepared from a Grubbs second generation catalyst (G2) as follows:

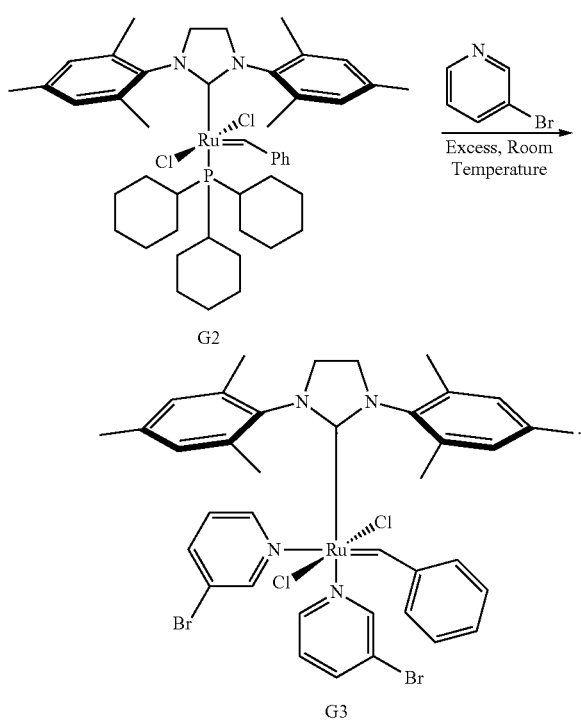

G2

G3

The polymerization of the monomers is conducted in a suitable solvent, for example, solvents generally used for conducting ROMP polymerizations. Examples of suitable solvents include aromatic hydrocarbons such as benzene, toluene, and xylene, aliphatic hydrocarbons such as n-pentane, hexane, and heptane, alicyclic hydrocarbons such as cyclohexane, and halogenated hydrocarbons such as dichloromethane, dichloroethane, dichloroethylene, tetrachloroethane, chlorobenzene, dichlorobenzene, and trichlorobenzene, as well as mixtures thereof.

The monomer concentration can be in the range of 1 to 50 wt %, preferably 2 to 45 wt %, and more preferably 3 to 40 wt %.

The polymerization can be carried out at any suitable temperature, for example, from −20 to +100° C., preferably 10 to 80° C.

The polymerization can be carried out for any time suitable to obtain the appropriate chain length of each of the blocks, which can be from about 1 minute to 100 hours.

The amount of catalyst can be chosen in any suitable amount. For example, the molar ratio of the catalyst to the monomer can be about 1:10 to about 1:1000, preferably about 1:50 to 1:500, and more preferably about 1:100 to about 1:200. For example, the molar ratio of the catalyst to the monomer could be 1:n and 1:m, where n and m are the average degrees of polymerization.

The copolymer can be isolated by a suitable technique, for example, precipitation with a nonsolvent.

The copolymer of the invention can be characterized for its molecular weight and molecular weight distribution by any known techniques. For example, a MALS-GPC technique can be employed. The technique uses a mobile phase to elute, via a high pressure pump, a polymer solution through a bank of columns packed with a stationary phase. The stationary phase separates the polymer sample according to the chain size followed by detecting the polymer by three different detectors. A series of detectors can be employed, e.g., an Ultraviolet detector (UV-detector), followed by a multi-angle laser light scattering detector (MALS-detector), which in turn, is followed by a refractive index detector (RI-detector) in a row. The UV-detector measures the polymer light absorption at 254 nm wavelength; the MALS-detector measures the scattered light from polymer chains relative to mobile phase.

The copolymers of the invention are highly monodisperse. For example, the copolymers have an Mw/Mn of 1.05 to 1.5, preferably 1.1 to 1.2.

In accordance with an embodiment, the invention provides a method of preparing copolymer Poly(NTEG-b-NPF6) or Poly(NTEG-b-NPF10), comprising:

(i) polymerizing 5-(monomethoxy triethyleneglycol) norbornene (NTEG) catalyzed by a ring opening metathesis polymerization (ROMP) catalyst to obtain a homopolymer polyNTEG; and (ii) sequentially polymerizing on a chain end of the homopolymer obtained in (i) 5-(perfluorohexyl)norbornene or 5-(perfluorodecyl)norbornene, catalyzed by a ROMP catalyst.

The method is illustrated below:

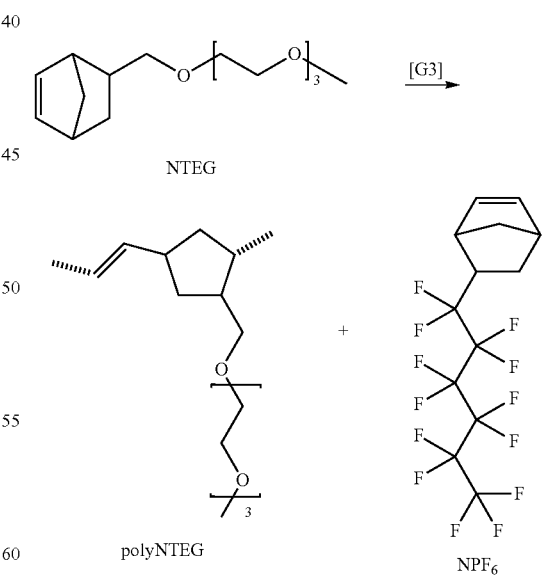

-continued
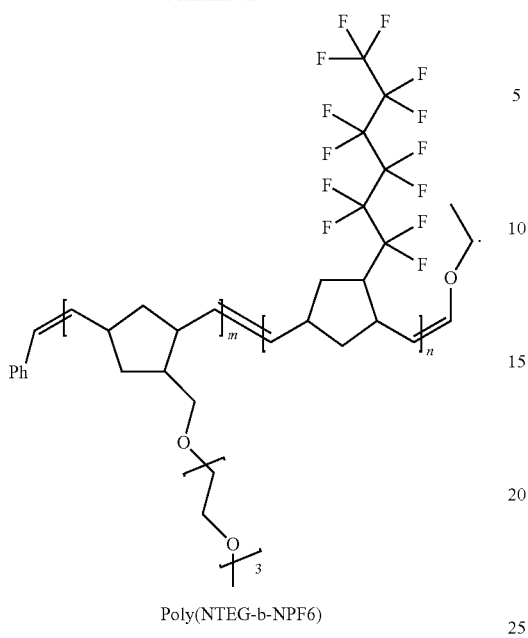
Poly(NTEG-b-NPF6)
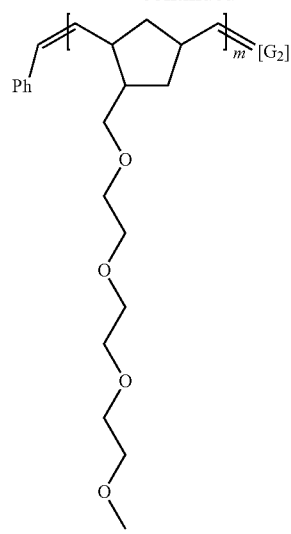
5-(Perfluorohexyl)norbornene
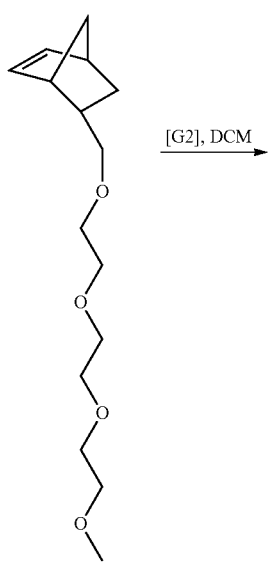
NTEG, Mw = 270.4
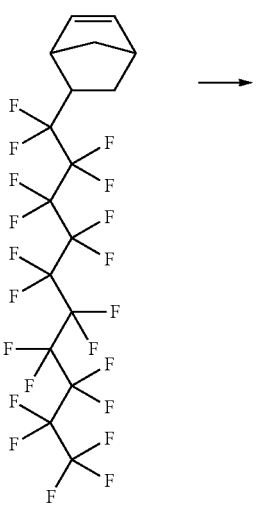
Poly(NTEG)

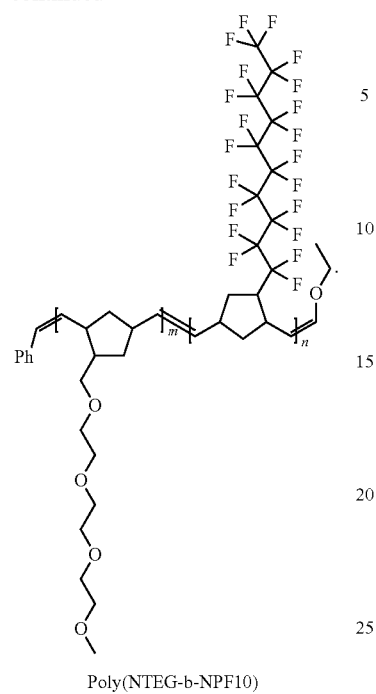

Poly(NTEG-b-NPF10)

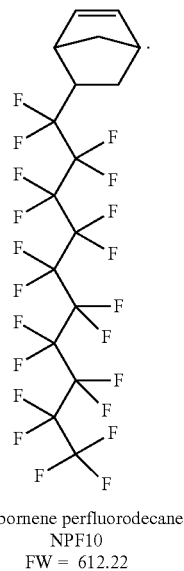

Norbornene perfluorodecane
NPF10
FW = 612.22

The present invention further provides a method of preparing copolymers having ion-exchange or chelating functionalities as described above, comprising providing a copolymer comprising repeat units A and B, wherein A is of the formula:

and B is of the formula

In accordance with an embodiment, the invention provides a method of preparing random copolymer Poly(NTEG-r-NPF6), comprising polymerizing a mixture of NTEG and 5-(perfluorohexyl)norbornene catalyzed by a ROMP catalyst.

5-(Perfluorodecyl)norbornene can be prepared from cyclopentadiene and 1H, 1H, 2H-perfluoro-10-decene as illustrated below:

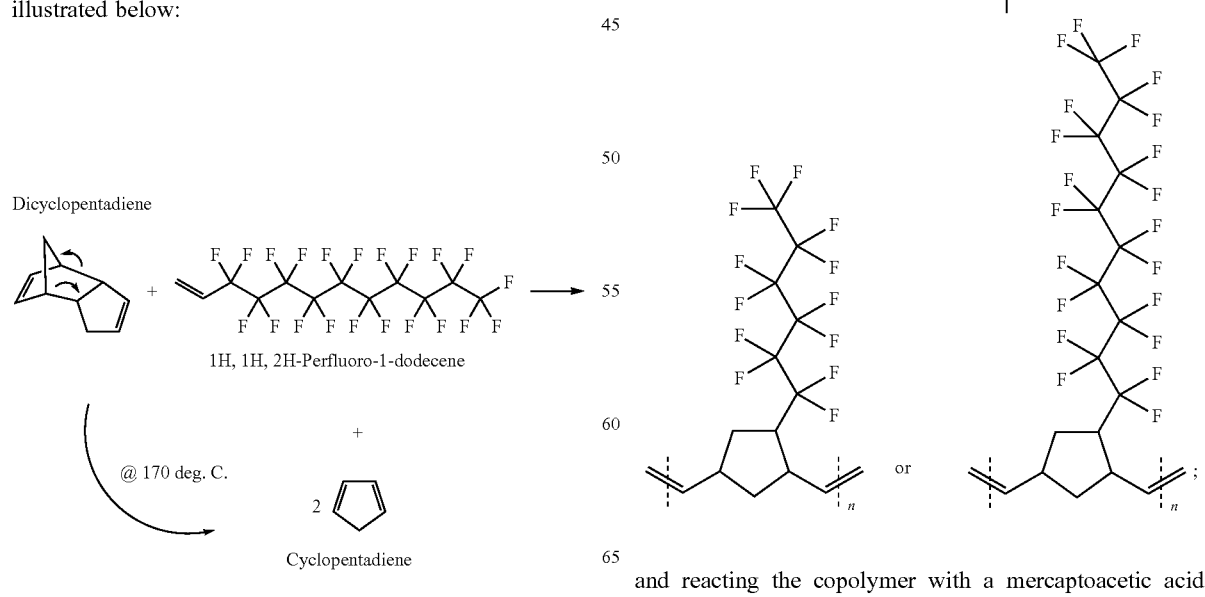

and reacting the copolymer with a mercaptoacetic acid, mercaptoethylsulfonate salt or thioglycerol.

For example, copolymer poly(NTEG-b-PNF6) MAcOH, poly(NTEG-b-PNF6) MeSNa, or poly(NTEG-b-PNF6) thioglycerol can be prepared by a method comprising reacting poly(NTEG-b-PNF6) with a mercaptoacetate anion, mercaptoethylsulfonate anion, or thioglycerol, as illustrated below:

The surface tension of the resulting membrane can be determined as follows. For example, a sheet of PTFE membrane is coated at room temperature by pre-wetting the membrane sheet with IPA solvent and soaking the membrane in polymer solution with concentration that ranges between about 0.1% and 10% by mass. The PTFE sheet coating time

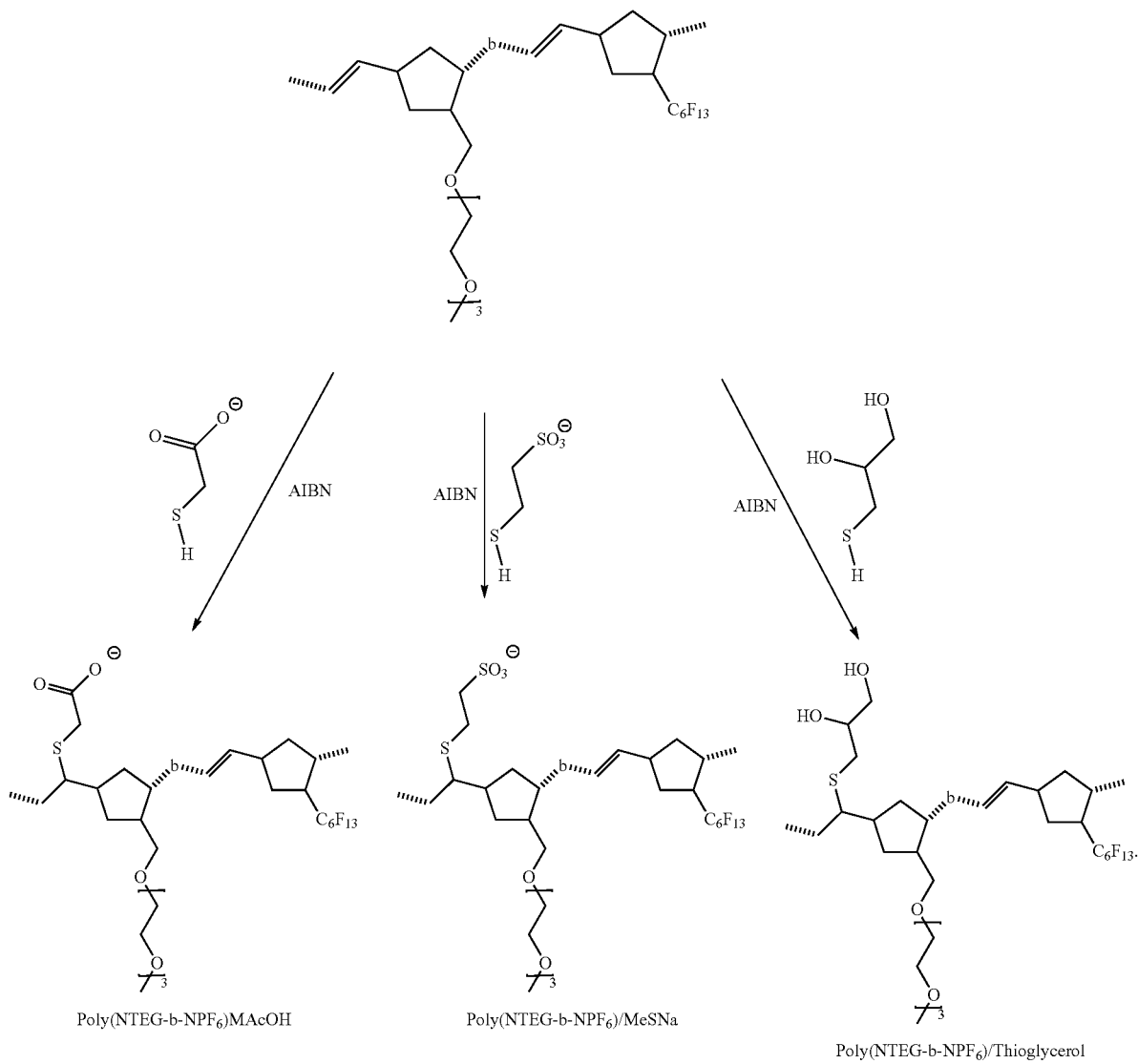

The present invention further provides a composite hydrophilic porous membrane comprising a porous fluoropolymer support and a copolymer described above, wherein the copolymer is optionally crosslinked.

The present invention further provides a method of hydrophilically modifying a porous fluorocarbon support comprising:

(i) providing a porous fluoropolymer support;
(ii) coating the porous fluoropolymer support with a solution comprising a solvent and a copolymer described above;
(iii) drying the coated support from (ii) to remove at least some of the solvent from the solution; and optionally
(iv) crosslinking the copolymer present in the coated membrane.

ranges between about 1 min and 12 hours. After soaking the membrane, the membrane is dried in convection oven at 100° C.-160° C. The drying time ranges between about 10 minutes and 12 h. The PTFE membrane wetting characteristics are measured by measuring the critical wetting surface tension.

The change in surface modification in terms of surface tension was measured by measuring the critical wetting surface tension (CWST). The method relies on a set of solutions of certain composition. Each solution has specific surface tension. The solutions surface tension ranges from 25 to 92 dyne/cm in small non-equivalent increments. To measure membrane surface tension, it is positioned on to top of white light table, one drop of a solution of certain surface tension is applied to the membrane surface and the time the drop takes to penetrate through the membrane and become bright white as an indication of light going through the membrane is recorded. Instant wetting is considered when the time the drop takes to penetrate the membrane is ≤10 seconds. If the time >10 seconds, the solution is considered to partially wet the membrane.

Crosslinking can be carried out by any suitable method, for example, by the use of a photoinitiator and a high energy radiation, e.g., UV. It is contemplated that the crosslinking would provide a highly stable polymer network in the membrane. FIG. 1 illustrates a proposed structure of such a crosslinked membrane.

The crosslinking can be carried out as follows. The polymer coated PTFE sheets are optionally pre-wet with IPA, the sheets are then washed with the solvent with which the photo-initiator is prepared in to exchange IPA with that solvent. The sheets are then soaked in a solution of photo-initiator with certain concentration for a certain time followed by exposure to UV irradiation. The soaking time in photo-initiator solution ranges from 1 minute to 24 hours. The UV irradiation time ranges from 30 seconds to 24 hours. The membrane critical wetting surface tension (CWST), performance characterization, and/or SPM testing are then measured. "SPM" herein means hot sulfuric acid hydrogen peroxide mixture ($H_2SO_4$(96%): $H_2O_2$(30%) of 80:20 by volume) at 120 to 180° C.

In accordance with an embodiment of the invention, the hydrophilic fluoropolymer membrane is a porous membrane, e.g., a nanoporous membrane, for example, a membrane having pores of diameter between 1 nm and 100 nm, or a microporous membrane having pores of diameter between 1 μm and 10 μm.

Hydrophilic fluoropolymer porous membranes according to embodiments of the invention can be used in a variety of applications, including, for example, diagnostic applications (including, for example, sample preparation and/or diagnostic lateral flow devices), ink jet applications, lithography, e.g., as replacement for HD/UHMW PE based media, filtering fluids for the pharmaceutical industry, metal removal, production of ultrapure water, treatment of industrial and surface waters, filtering fluids for medical applications (including for home and/or for patient use, e.g., intravenous applications, also including, for example, filtering biological fluids such as blood (e.g., virus removal)), filtering fluids for the electronics industry (e.g., filtering photoresist fluids in the microelectronics industry and hot SPM), filtering fluids for the food and beverage industry, beer filtration, clarification, filtering antibody- and/or protein-containing fluids, filtering nucleic acid-containing fluids, cell detection (including in situ), cell harvesting, and/or filtering cell culture fluids. Alternatively, or additionally, porous membranes according to embodiments of the invention can be used to filter air and/or gas and/or can be used for venting applications (e.g., allowing air and/or gas, but not liquid, to pass therethrough). Membranes according to embodiments of the inventions can be used in a variety of devices, including surgical devices and products, such as, for example, ophthalmic surgical products.

In accordance with embodiments of the invention, the hydrophilic fluoropolymer porous membranes can have a variety of configurations, including planar, flat sheet, pleated, tubular, spiral, and hollow fiber.

Hydrophilic fluoropolymer porous membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive porous membrane or filter comprising at least one inventive porous membrane is disposed in a housing comprising at least one inlet and at least two outlets and defining at least a first fluid flow path between the inlet and the first outlet, and a second fluid flow path between the inlet and the second outlet, wherein the inventive porous membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

In accordance with an embodiment, the hydrophilic fluoropolymer porous membrane comprises any suitable porous support, e.g., microporous, fluoropolymer support, for example, supports made from PTFE, PVDF (polyvinylidene fluoride), PVF (polyvinyl fluoride), PCTFE (polychlorotrifluoroethylene), FEP (fluorinated ethylene-propylene), ETFE (polyethylenetetrafluoroethylene), ECTFE (polyethylenechlorotrifluoroethylene), PFPE (perfluoropolyether), PFSA (perfluorosulfonic acid), and perfluoropolyoxetane. The porous support can have any suitable pore size, e.g., from about 10 nm to about 10 microns, preferably PTFE and PVDF.

The present invention further provides a hydrophilically modified fluoropolymer membrane produced by the method described above.

The present invention further provides a method of filtering a fluid, the method comprising passing the fluid through the membrane described above.

The following examples further illustrate the invention but, of course, should not be construed as in any way limiting its scope.

EXAMPLE 1

Materials: The following materials were purchased and used as received.

Dimethyl 5-norbornene-2,3-dicarboxylate (C3) was purchased from Alfa Aesar,

Dichloromethane (DCM) was stored over activated Alumina and purged with Argon before use, Isopropyl alcohol (IPA), dicyclopentadiene (DCPD), 1H,1H,2H-Perflouro-1-octene (PF6), 1H,1H,2H-Perflouro-1-dodecene (PF10), toluene, thionyl chloride, ethylacetate, dimethylformamide (DMF), Maleimide, furan, diisopropylazodicarboxylate (DIAD), triphenylphosphine ($Ph_3P$), 1-haxadecanol, tetrahydrofuran (THF), ethyl acetate, N-phenylmaleimide, acetonitrile, methanol, Grubbs second generation catalyst, 3-bromopyridine, and pentane were obtained from Sigma-Aldrich Co. and used without further treatment. Dichloropentane, also obtained from Sigma-Aldrich Co., was treated with basic alumina before use.

EXAMPLE 2

This example illustrates the preparation of dichloro[1,3-bis(2,4,6-trimethylphenyl)-2-imidazolidinylidene](benzylidene)bis(3-bromopyridine)ruthenium(II) (G3) catalyst.

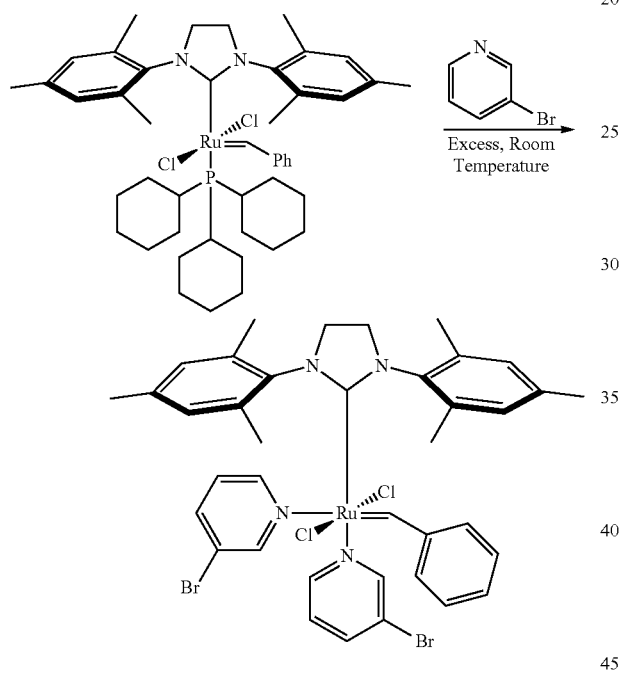

The second generation Grubbs catalyst (G2) illustrated above (1.0 g, 1.18 mmol) was mixed with 3-bromopyridine (1.14 mL, 11.8 mmol) in 50 mL flask. Upon stirring at room temperature for 5 min, the red mixture turned into bright green. Pentane (40 mL) was added with stirring for 15 minutes and green solid was obtained. The mixture was cooled in the freezer for 24 h and filtered under vacuum. The resulting G3 catalyst, a green solid, was washed with cold pentane and dried under vacuum at room temperature to give a yield of 0.9 g, 88% yield.

EXAMPLE 3

This example illustrates the gel permeation chromatographic characterization of the homopolymer and copolymers in accordance with an embodiment of the invention.

The homopolymer and block copolymer obtained was characterized for their molecular weight and molecular weight distribution properties by the MALS-GPC technique under the following conditions:

Mobile phase: Dichloromethane (DCM).
Mobile phase temperature: 30° C.
UV wavelength: 245 nm.
Columns used: three PSS SVD Lux analytical columns (styrene-divinylbenzene copolymer network), columns having as stationary phase beads of diameter 5 μm and pore sizes of 1000 A, 100,000 A, and 1,000,000 A, and guard columns.
Flow rate: 1 mL/min.
GPC system: waters HPLC alliance e2695 system with UV and RI detectors
MALS system: The DAWN HELEOS 8 system with 8 detectors operating a laser at 664.5 nm.

EXAMPLE 4

This example illustrates a procedure to prepare NPF6 monomer in accordance with an embodiment of the invention.

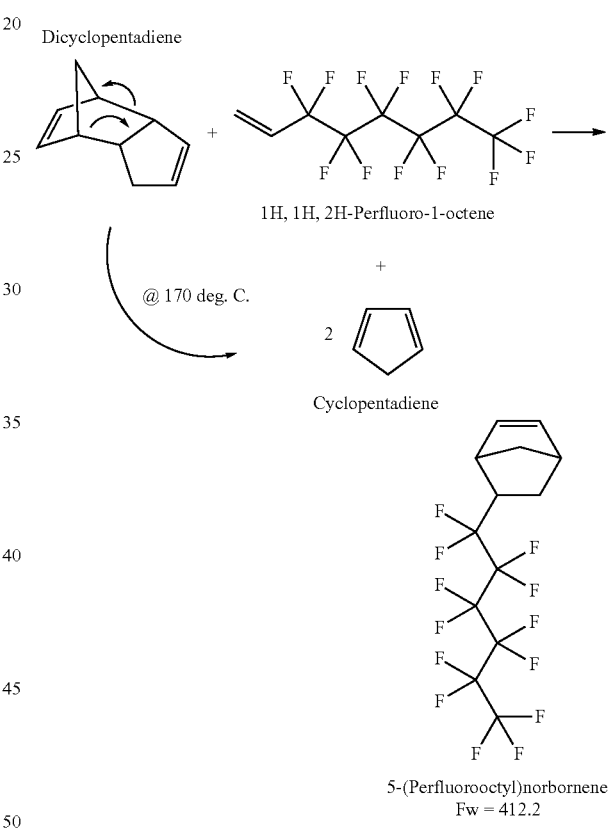

A Parr high pressure reactor cylinder vessel was charged with DCPD (100 ml, 737 mmol), PF6 (168 ml, 737 mmol) and the cylinder was attached to the reactor, and hydroquinone (2.43 g, 22.1 mmol), heated to 170° C. for 72 hours. The reaction content was dissolved into 150 ml DCM and transferred into 500 ml round bottom flask to purify the monomer by vacuum distillation.
$^1$H-NMR ($CDCl_3$): δ (ppm) 6.2-6.0 (2H), 3.2 (1H), 3.0 (1H), 2.8 (1H), 2.0 (1H), 1.5 (1H), and 1.2-1.4 (2H).
$^{19}$F-NMR ($CDCl_3$): δ −89.9(s), −112.6 (m), −123.8 to −121.3 (m), −127.1 to −125.3 (m).

EXAMPLE 5

This example illustrates a procedure to prepare NPF10 monomer in accordance with an embodiment of the invention.

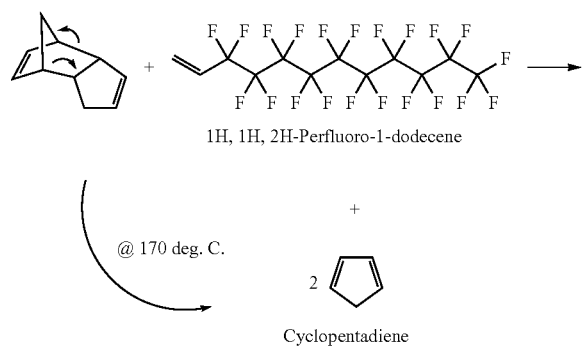

Dicyclopentadiene 1H, 1H, 2H-Perfluoro-1-dodecene

@ 170 deg. C.

2 Cyclopentadiene

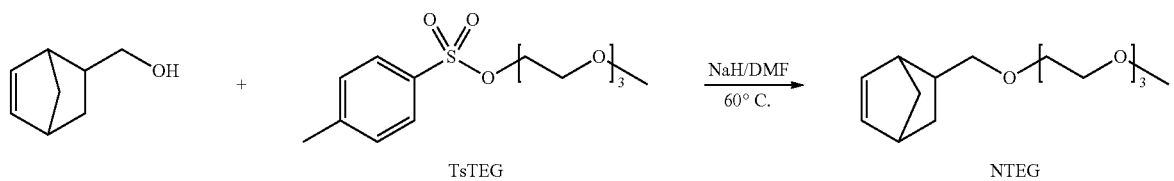

TsTEG

NTEG

NaH/DMF
60° C.

NaOH/THF
0-23° C.

-continued

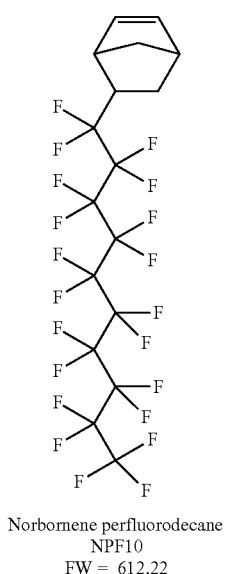

Norbornene perfluorodecane
NPF10
FW = 612.22

A Parr high pressure reactor cylinder vessel was charged with DCPD (24.6 ml, 183 mmol), PF6 (132 ml, 370 mmol) and the cylinder was attached to the reactor, and hydroquinone (1.08 g, 10 mmol), heated to 170 deg. C for 72 hours. The reaction content was dissolved into 150 ml DCM and transferred into 500 ml round bottom flask to purify the monomer by vacuum distillation.

$^1$H-NMR (CDCl$_3$): δ (ppm) 6.2-6.0 (2H), 3.2 (1H), 3.0 (1H), 2.8 (1H), 2.0 (1H), 1.5 (1H), and 1.2-1.4 (2H). $^{19}$F-NMR (CDCl$_3$): δ −80.9(s), −112.6 (m), −123.8 to −121.4 (m), −127.2 to −125.5 (m).

EXAMPLE 6

This example illustrates a procedure to prepare triethylene glycol monomethyl ether tosylate (TEG-OTs).

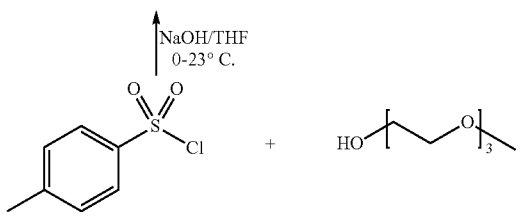

Triethyleneglycol monomethyl ether tosylate (TsTEG):

50 g of triethyleneglycol monomethyl ether was taken in 175 ml THF and the contents were cooled in a water-ice bath. To the cooled solution, sodium hydroxide (36.5 g) in 175 ml water was added. Tosyl chloride (75 g) in 125 ml THF was then added slowly using a dropping funnel over 30 min. After the addition, the contents were allowed to warm up to ambient temperature and stirred overnight. After completion of reaction, the separated organic layer was collected and the aqueous layer was extracted with diethyl ether (4×100 ml). The combined organic layer was washed with 10% sodium hydroxide solution, followed by saturated brine and water. It was dried over anhydrous sodium sulfate, filtered and concentrated to obtain the pure product as viscous liquid (82.3 g, 85% yield).

Triethylene Glycol-Based Norbornene Monomer (NTEG):

5-Norbornene-2-methanol (15 g) was added dropwise to a suspension of NaH (4.5 g) in 600 mL of dry DMF under a argon atmosphere. The mixture was stirred at room temperature for 10 min and at 60° C. for 1 h. TsTEG (58.5 g) dissolved in 75 mL of DMF was added at room temperature. The resulting mixture was stirred at room temperature for 10 min and then at 60° C. for 12 h, after which 750 mL of 0.1 M NaCl solution was added and the layers were separated. The aqueous layer was extracted with ethyl acetate, and the combined organic layers were washed with 10% NaHCO$_3$ and brine, dried over MgSO$_4$, and concentrated under vacuum. The residue obtained was purified by column chromatography on silica gel (heptane: ethyl acetate=3:1) to afford a colorless oil (18.62 g, 57% yield).

$^1$H NMR (CDCl3, 400 MHz): δ (ppm)=6.10-5.90 (m, 2H), 3.65-3.52, 3.19-3.03 (m, 14H), 3.36 (s, 3H), 2.88-2.73 (m, 2H), 2.33, 1.68 (br s, 1H), 2.35-2.32, 1.10-1.05 (m, 1H), 1.28-1.20 (m, 2H), 0.49-0.44 (m, 1H).

EXAMPLE 7

This example demonstrates the synthesis and properties of a copolymer in accordance with an embodiment of the invention.

Poly(NTEG-b-NPF6): The Grubbs $2^{rd}$ generation (G2) catalyst (18 mg, 0.021 mmol) and triphenylphosphine (277 mg, 1.06 mmol) were weighed in 40 mL vial with equipped with fluoropolymer resin-silicone septa open-top cap. The catalyst was dissolved in argon-degassed dichloromethane (DCM) (40 mL) and transferred via cannula to a clean 1 L RBF equipped with stirring bar. A solution of the first monomer NTEG (2.0 g, 7.4 mmol) in DCM (100 mL) was degassed with argon and transferred into the catalyst solution and shined for 30 minutes. An aliquot of 1-2 mL of the homopolymer formed from the first monomer was taken after 30 minutes for molecular weight characterization. A solution of the second monomer NPF10 (1.55 g, 2.54 mmol) in DCM (200 mL) was degassed with argon and transferred into the growing homopolymer solution in the RBF, and the contents of the flask were stirred for another 180 minutes. Ethyl vinyl ether (2 mL) was then added to the yellow solution of the diblock copolymer to terminate the polymerization. The resulting polymer was precipitated in methanol (2 L, 2 X) to recover the pure polymer as a white solid. The polymer was filtered and dried under vacuum at room temperature; yield (9.2 g, 98%). $^1$H-NMR (300 MHz, CDCl$_3$): δ (ppm) 6.0 to 6.35 (s, broad), 5.5 to 6.0 (s, broad), 4.5 to 5.2 (s, broad), 4.3 to 4.5 (s, broad), 3.5 to 3.8 (m, broad), 3.0 to 3.3 (s, broad), 2.0 to 2.4 (s, broad), 1.5 to 1.7 (s, broad), 1.0 to 1.3 (s).

Figure 2:
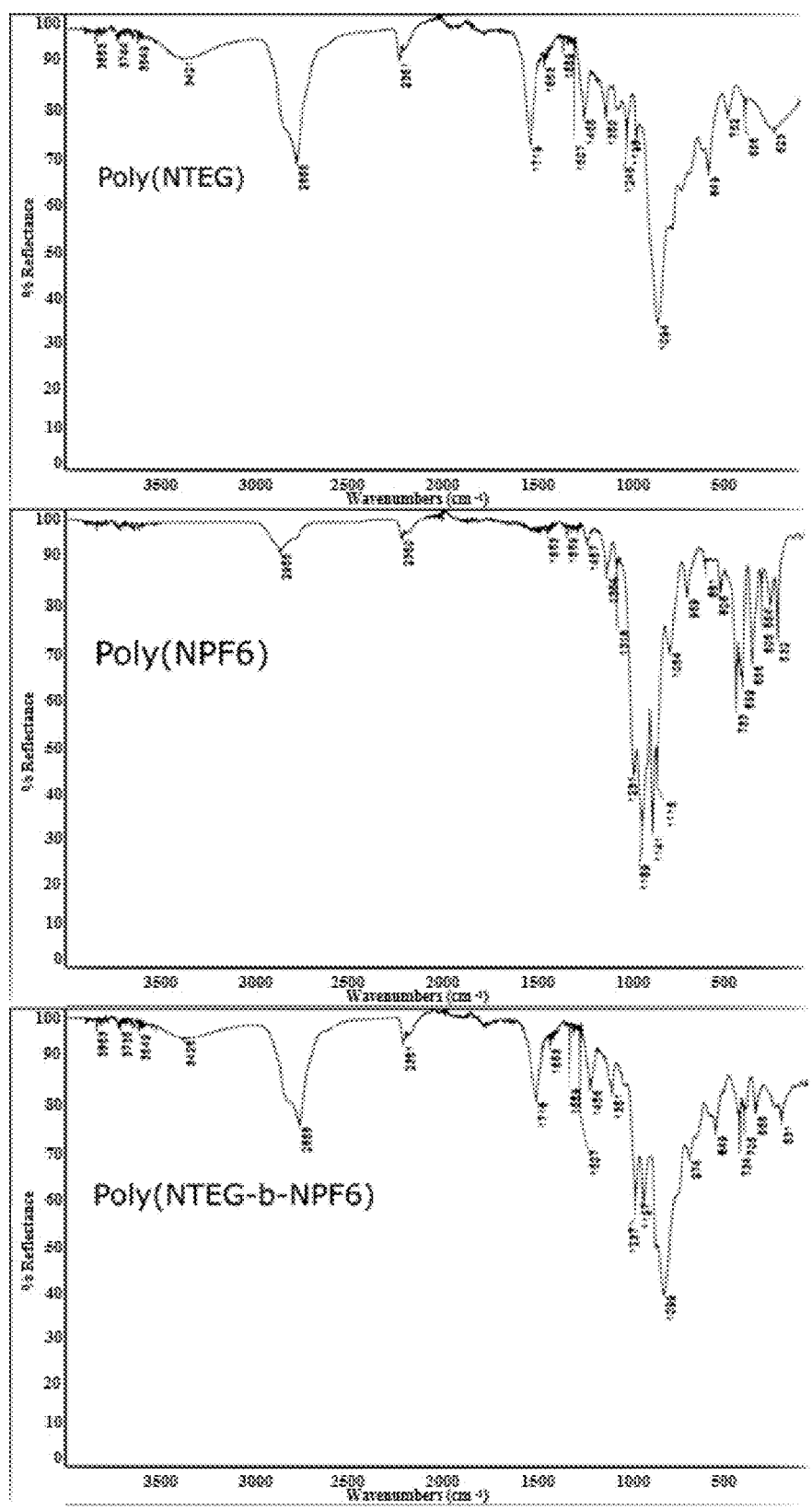
FIG. 2 depicts the FTIR of poly(NTEG) homopolymer and poly(NTEG-b-NPF6) copolymer in accordance with an embodiment of the invention.

The FTIR of poly(NTEG), polyNPF6, and poly(NTEG-b-NPF6) are shown in FIG. 2. Elemental Analysis data are set forth in Table 1 below.

Figure 3:
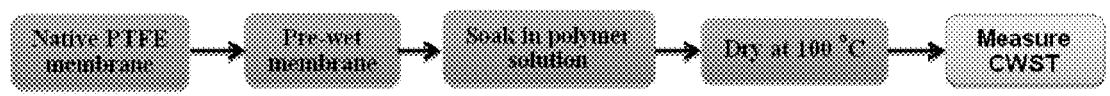
FIG. 3 illustrates a process of coating of a porous fluorocarbon support with a copolymer in accordance with an embodiment of the invention.

The sequence of coating of a flurocarbon porous support with a copolymer of the invention is illustrated in FIG. 3.

The Poly(NTEG-b-NPF6) copolymer was dissolved in THF to provide a 1% by wt solution. A PTFE microporous membrane sample was immersed in the polymer solution for 1 hr. The PTFE sample was dried at 160° C. for 10 minutes, followed by 30 min of washing in THF. The sample was again dried at 160° C. for 10 minutes. The CWST of the coated PTFE membrane was measured to be 33.4 dyne/cm (CWST1). The CWST of the starting PTFE membrane was 25 dyne/cm. The post-wash CWST was 31.3 dyne/cm (CWST2) and after treatment with a hot mixture of sulfuric acid and hydrogen peroxide (SPM), the CWST was 31.3 dyne/cm (CWST6).

EXAMPLE 8

This example demonstrates a method UV crosslinking Poly(NTEG-b-NPF6) copolymer and the properties of a copolymer in accordance with an embodiment of the invention.

Figure 4:
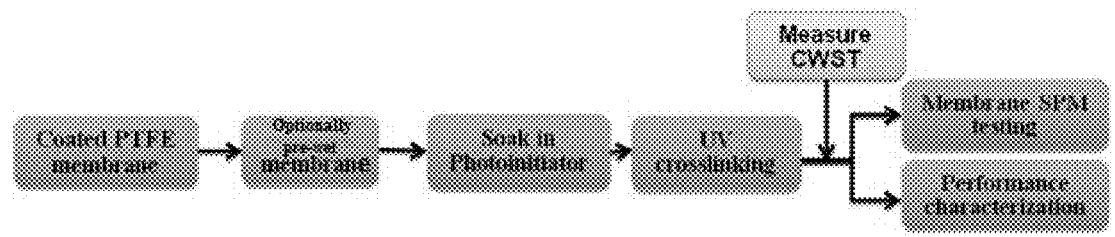
FIG. 4 illustrates a process of coating and measuring the CWST adhesion conditions of the hydrophilic porous membranes in accordance with an embodiment of the invention.

The procedure is illustrated in FIG. 4. A coating was formed from a 1% by mass copolymer solution and crosslinking was carried out using Irgacure 2959 (0.25%) in DI water.

The CWST data are set forth in Table 2.

TABLE 2

| | CWST data | | |
|---|---|---|---|
| Polymer | CWST coating | CWST crosslinking | CWST Post SPM |
| Poly(NTEG-b-NPF6) | 33 | 33 | 30 |
| Poly(NTEG-b-NPF6) | 33 | 33 | 30 |
| Poly(NTEG-b-NPF10) | 33 | 33 | 30 |

EXAMPLE 9

This example demonstrates the synthesis and properties of another copolymer in accordance with an embodiment of the invention.

The random copolymer synthesized by using ROMP living polymerization on a mixture of the monomers, as illustrated below:

TABLE 1

| | | Elemental Analysis | | | | | | | | | |
|---|---|---|---|---|---|---|---|---|---|---|---|
| | | | | | | | | | | Mole % | |
| Polymer Acronym | Elemental Analysis | Theoretical (w %) | | | Actual (w %) | | | F-block w % | Hydro-philic w % | F-block % | Hydro-philic % |
| | | C % | H % | F % | C % | H % | F % | | | | |
| Poly(NTEG)homo-polymer | CH | 66.67% | 9.63% | | 64.54% | 10.41% | | | | | |
| Poly(NPF6)homo-polymer | CH, F | 37.86% | 2.18% | 59.95% | 40.42% | 2.27% | 58.43% | | | | |
| Poly(NTEG-b-NPF6) | CH, F | | | | 58.37% | 8.71% | 15.27% | 25% | 75% | 18% | 82% |

NTEG, Mw = 270.18
cis--Norbornene-triethylene glycol

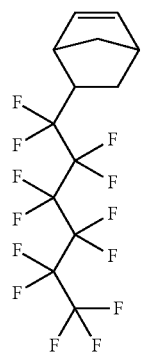

5-(Perfluorohexyl)norbornene

[G3], DCM

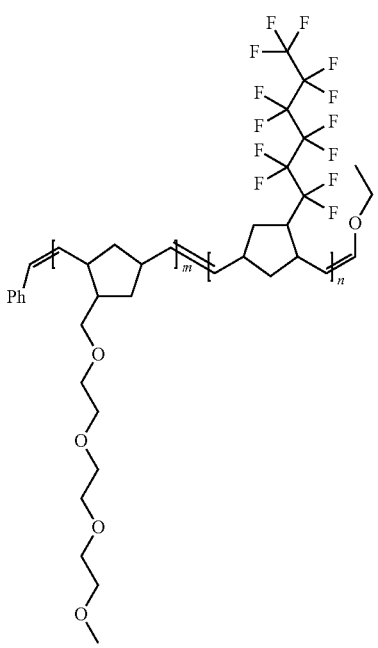

Poly(NTEG-r-NPF6)

An advantage of the above method of preparing random copolymer is that the monomers and solvents do not have to be highly pure.

To a clean flame-dried 250 ml RBF equipped with stirring bar, G3 catalyst (15 mg, 0.017 mmol) dissolved in Argon purged DCM (25 ml) was transferred via cannula, in a separate vial a solution of NTEG monomer (3.0 g, 11.1 mmol) and NPF6 (1.14 g, 2.78 mmol) in DCM (125 ml) was added to the stirring G3 catalyst green solution to turn into light yellow green to light brown. Stirring was continued of a total of 15 h followed by addition of excess of vinyl ethyl ether to terminate polymerization. The polymer solution was passed through a column of basic alumina, silica gel, and celite to remove the catalyst. The solvent was removed by rotavap and polymer was colorless and highly viscous turned solid upon cooling. Yield (4.0 g, 92%). $^1$H-NMR (300 MHz, CDCl$_3$): δ (ppm) 5.7 to 5.0 (m, broad), 3.8 to 3.4 (m, broad), 3.4 to 2.9 (m, broad), 2.9 to 2.45 (m, broad), 2.45 to 1.3 (m, broad), 1.3 to 1.0.6 (m, broad).

Figure 5:
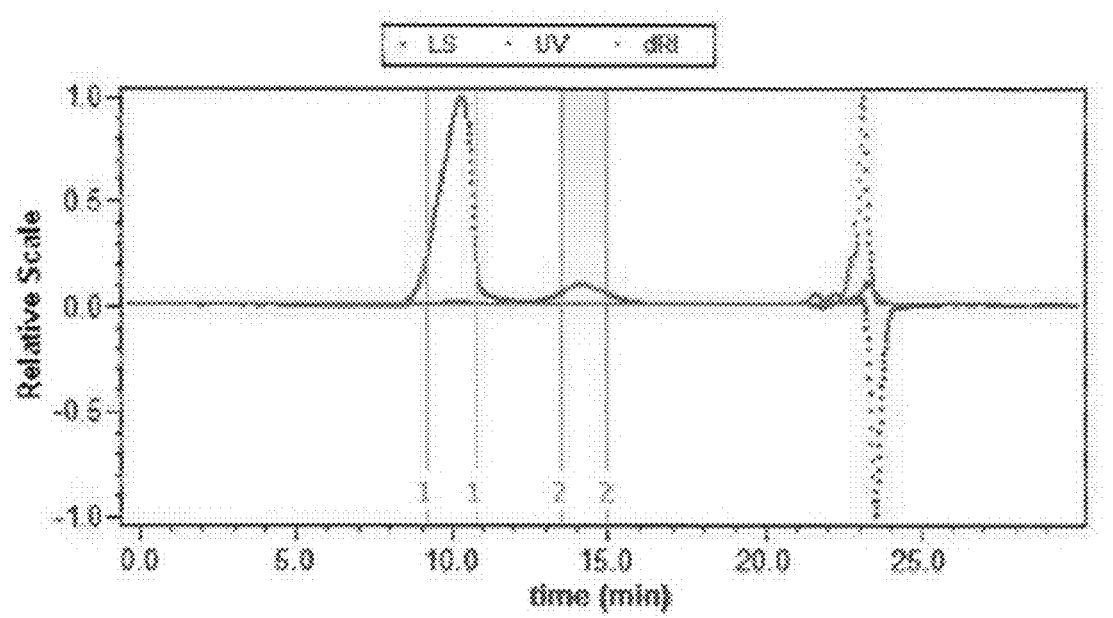
FIG. 5 depicts the GPC trace of Poly(NTEG-r-NPF10).
Figure 6:
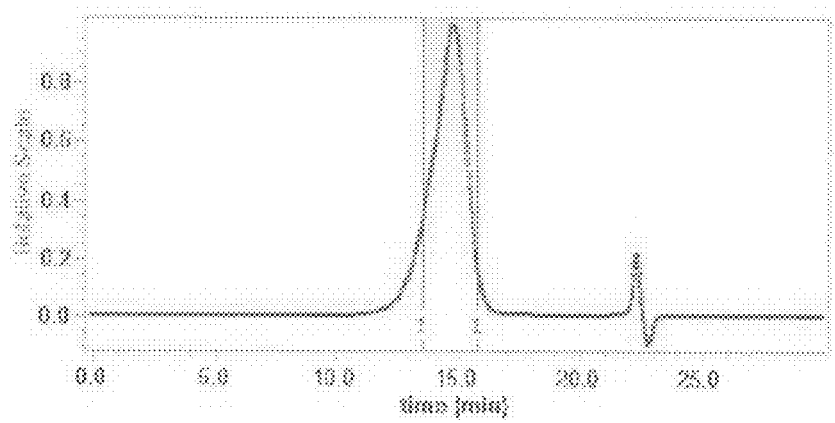
FIG. 6 depicts the GPC trace of Poly(NTEG-b-NPF10).

The GPC trace of the copolymer in dichloromethane is shown in FIG. 5. Mn=74 KDa, Mw=84 KDa, Mw/Mn=1.14. The elemental analysis data are set forth in Table 2 below.

TABLE 2

| | Elemental Analysis | | | | |
|---|---|---|---|---|---|
| | Elemental | Actual (w %) | | | |
| Material ID | Analysis | C % | H % | N % | F % |
| Poly(NTEG-r-NPF6)-1 | C, H, N, F | 52.78 | 7.11 | 0.13 | 11.58 |

The Poly(NTEG-r-NPF6) copolymer was dissolved in THF to provide a 1% by wt solution. A PTFE microporous membrane sample was immersed in the polymer solution for 1 hr. The PTFE sample was air dried for 10 minutes and oven dried at 100° C. for 10 minutes, followed by 30 min of washing in THF. The sample was again air dried for 10 minutes and oven dried at 100° C. for 10 minutes. The CWST of the coated PTFE membrane increased upon treatment with the copolymer.

The CWST of the starting PTFE membrane was 25 dyne/cm. The post-wash CWST was 31.3 dyne/cm (CWST2) and after treatment with a hot mixture of sulfuric acid and hydrogen peroxide (SPM), the CWST was 31.3 dyne/cm (CWST6). The CWST values are set forth in Table 3 below. The PTFE CWST increases from 25.4 dyne/cm to 39-40 dyne/cm upon treating the membrane and washing in the same coating solvent.

TABLE 3

| CWST values of PTFE membranes | | |
|---|---|---|
| | | CWST (dynes/cm) |
| Coating ID | Polymer Concentration for coating, mass % | Instant / Timed 10"-15" |
| PTFE native | NA | 25.4 / 25.4 |
| Poly(NTEG-r-NPF6)-1 | 1 | 35 / 37-39 |
| Poly(NTEG-r-NPF6)-2 | 1 | 35 / 37-39 |
| Poly(NTEG-r-NPF6)-3 | 1 | 35 / 37-39 |
| Poly(NTEG-b-NPF6) | 1 | 33.4 / 33.4 |

EXAMPLE 10

This example demonstrates a method of crosslinking the copolymer Poly(NTEG-r-NPF6) within a fluoropolymer membrane in accordance with an embodiment of the invention. The coating procedure is depicted in FIG. 4. The results obtained are set forth in Table 4.

TABLE 4

| Coating polymer + PI | PI concentration (%) | UV time (seconds) | CWST before SPM | CWST after SPM | Note |
|---|---|---|---|---|---|
| Poly(NTEG-r-NPF6) + Irgacure 2959 | 0.1 | 60'/90/120' | 33 | 30 | |
| | | | 33 | 25 | |
| | | | 33 | 30 | 30 Partial after SPM |
| Poly(NTEG-r-NPF6) + Irgacure 2959 | 0.25 | | 33 | 30 | 30 Partial after SPM |
| | | | 33 | 30 | 35 partial before SPM/30 Partial after SPM |
| | | | 33 | 30 | 35 partial before SPM/30 Partial after SPM |
| | 0.5 | | 35 | 30 | |
| | | | 33 | 30 | |
| | | | 33 | 30 | |

Photoinitiator = Irgacure 2959

EXAMPLE 11

This example demonstrates the synthesis and properties of another copolymer in accordance with an embodiment of the invention.

Poly(NTEG-b-NPF 10)

The block copolymer was synthesized by using ROMP living polymerization on a mixture of the monomers, as illustrated below:

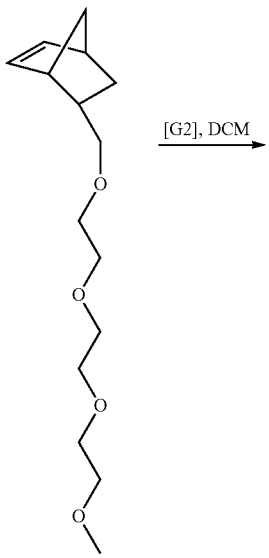

NTEG, Mw = 270.4

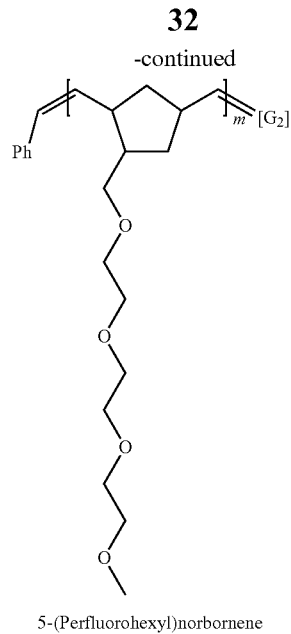

5-(Perfluorohexyl)norbornene

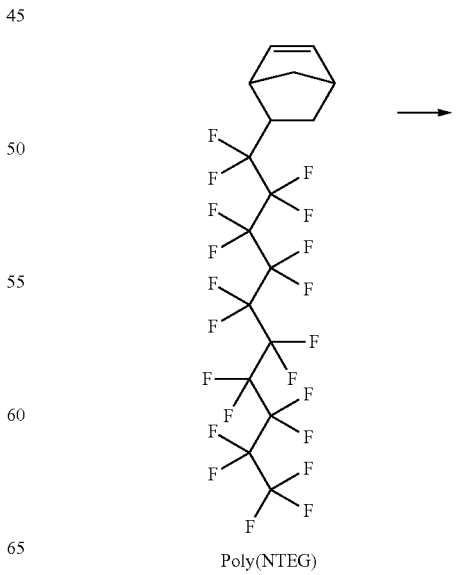

Poly(NTEG)

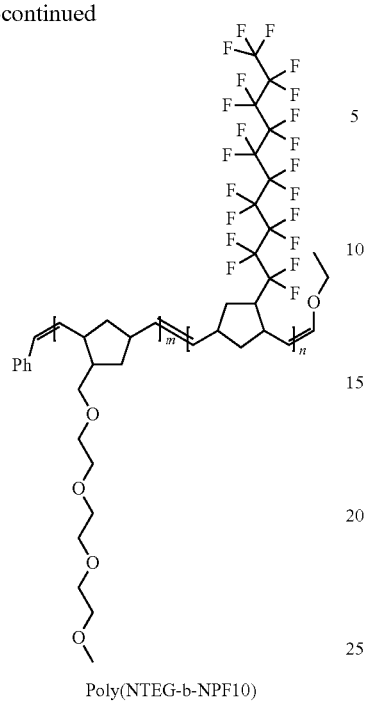

Poly(NTEG-b-NPF10)

The 5-(Perfluorodecyl)norbornene monomer was prepared through a Diels-Alder reaction, as follows:

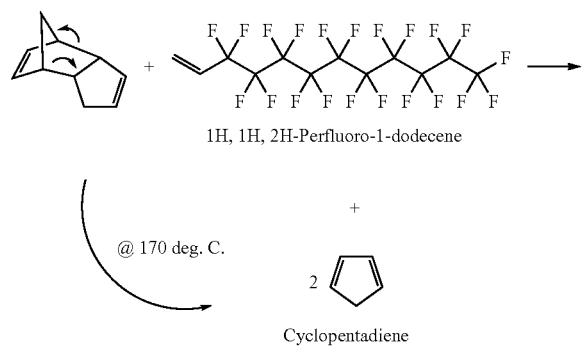

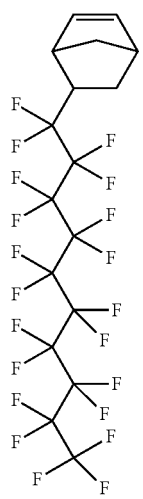

Norbornene perfluorodecane
NPF10
FW = 612.22

Synthetic procedure for making Poly(NTEG-b-NPF10): The Grubbs $2^{rd}$ generation (G2) catalyst (18 mg, 0.021 mmol) and triphenylphosphine (277 mg, 1.06 mmol) were weighed in 40 mL vial with equipped with fluoropolymer resin-silicone septa open-top cap. The catalyst was dissolved in argon-degassed dichloromethane (DCM) (40 mL) and transferred via cannula to a clean 1 L RBF equipped with stirring bar. A solution of the first monomer NTEG (2.0 g, 7.4 mmol) in DCM (100 mL) was degassed with argon and transferred into the catalyst solution and shirred for 30 minutes. An aliquot of 1-2 mL of the homopolymer formed from the first monomer was taken after 30 minutes for molecular weight characterization. A solution of the second monomer NPF10 (1.55 g, 2.54 mmol) in DCM (200 mL) was degassed with argon and transferred into the growing homopolymer solution in the RBF, and the contents of the flask were stirred for another 180 minutes. Ethyl vinyl ether (2 mL) was then added to the yellow solution of the diblock copolymer to terminate the polymerization. The resulting polymer was precipitated in methanol (2 L, 2 X) to recover the pure polymer as a white solid. The polymer was filtered and dried under vacuum at room temperature; yield (9.2 g, 98%).

$^1$H-NMR (300 MHz, CDCl$_3$): δ (ppm) 6.0 to 6.35 (s, broad), 5.5 to 6.0 (s, broad), 4.5 to 5.2 (s, broad), 4.3 to 4.5 (s, broad), 3.5 to 3.8 (m, broad), 3.0 to 3.3 (s, broad, 2.0 to 2.4 (s, broad), 1.5 to 1.7 (s, broad), 1.0 to 1.3 (s).

The GPC traceof Poly(NTEG-b-NPF10) is depicted in FIG. 5.

The Poly(NTEG-b-NPF10) copolymer was dissolved in THF to provide a 1% by wt solution. A PTFE microporous membrane sample was immersed in the polymer solution for 1 hr. The PTFE sample was air dried for 10 minutes, followed by 30 min of washing in THF. The sample was again air dried for 10 minutes. The CWST of the coated PTFE membrane increased upon treatment with the copolymer.

The PTFE CWST increased from 25.4 dyne/cm to 33.41 dyne/cm upon treating the membrane and washing in the same coating solvent. The polymer has a feed monomer molar ratio between the two monomers of [NTEG]:[NPF10]=90:10 mole% that offers a strong adhesion to PTFE membrane. The CWST values are set forth in Table 5.

TABLE 5

| Description | CWST 1 |
|---|---|
| Native PTFE | 25.4 |
| KA-N4P100-Poly-(NTEG-b-NPF10)-3 using 1% solution in THF | 33 (instant), 35 (<15 s) | brane sample was immersed in the polymer solution for 1 hr. The PTFE sample was dried at 160° C. for 10 minutes, at which CWST1 was measured. It was followed by 30 min of washing in THF and the CWST2 was measured. The sample was again dried at 160° C. for 10 minutes and CWST6 was measured. The CWST data are set forth in Table 6.

TABLE 6

| Polymer | Polymer ID | Coated Sample ID | Coating/Drying Condition | CWST1 (as coated) | CWST2 (Post Wash) | CWST6 (post SPM RT) |
|---|---|---|---|---|---|---|
| PTFE Native Membrane | | | None | 25 | 25 | 25 |
| Poly(NTEG-b-NPF6)/MAcOH | VT3-p98s1 | 0634D | THF:IPA/160 C. | 33.4 | 33.4 | 31.3 |
| Poly(NTEG-b-NPF6)/MeSNa | VT3-p98s2 | 0634E | THF:IPA/160 C. | 33.41 | 31.3 | 31.3 |
| Poly(NTEG-b-NPF6)/thioglycerol | VT3-p98s3 | 0634F | THF:IPA/160 C. | 33.41 | 31.3 | 31.3 |

TABLE 5-continued

| Description | CWST 1 |
|---|---|
| Poly-(NTEG-b-NPF6) - using 1% solution in THF | 33 |

The data in Table 5 illustrate a comparison between the contribution of NPF6 and NPF10 in the diblock copolymer to give higher CWST value at lower NPF10 content (10 for NPF10 vs 20% for NPF6).

EXAMPLE 12

This example demonstrates a method of chemically modifying the copolymer Poly(NTEG-b-NPF6) in order to provide chelating and/or ion exchange properties in accordance with an embodiment of the invention.

Thiolene reaction modifications of Poly(NTEG-b-NPF6) with MAcOH: Poly(NTEG-b-NPF6) (0.99 g), thioglycolic acid (MAcOH, 0.9 g), and AIBN (79.8 mg) were dissolved in 33 ml of THF and allowed to react at 55° C. for 26 h under nitrogen. The reaction mixture was poured into water. The precipitate obtained was re-dissolved in THF and precipitated again from heptane to yield a dark brown solid.

Thiolene reaction modifications of Poly(NTEG-b-NPF6) with MeSNa: Poly(NTEG-b-NPF6) (0.99 g), sodium 2-mercaptoethanesulfonate (MeSNa, 1.6 g), and AIBN (79.8 mg) were dissolved in 33 ml of THF and allowed to react at 55° C. for 26 h under nitrogen. The reaction mixture was poured into water. The precipitate obtained was re-dissolved in THF and precipitated again from heptane to yield a yellowish solid.

Thiolene reaction modifications of Poly(NTEG-b-NPF6) with thioglycerol: Poly(NTEG-b-NPF6) (0.99 g), 1-thioglycerol (1.05 g), and AIBN (79.8 mg) were dissolved in 33 ml of THF and allowed to react at 55° C. for 26 h under nitrogen. The reaction mixture was poured into water. The precipitate obtained was re-dissolved in THF and precipitated again from heptane to yield an off-white solid.

$^1$H-NMR (300 MHz, CDCl$_3$): δ (ppm) 5.7 to 5.0 (m, broad), 3.8 to 3.6 (m, broad), 3.6 to 3.4 (m broad), 3.4 to 3.3(s), 2.9 to 2.3 (m, broad), 2.3 to 1.75 (m, broad), 1.3 to 0.8 (m, broad).

The functionalized copolymer was dissolved in THF to provide a 1% by wt solution. A PTFE microporous mem- All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A composite hydrophilic porous membrane comprising a porous fluoropolymer support and a coating comprising a copolymer, wherein the copolymer comprises repeat units A and B, wherein A is of the formula:

and B is of the formula

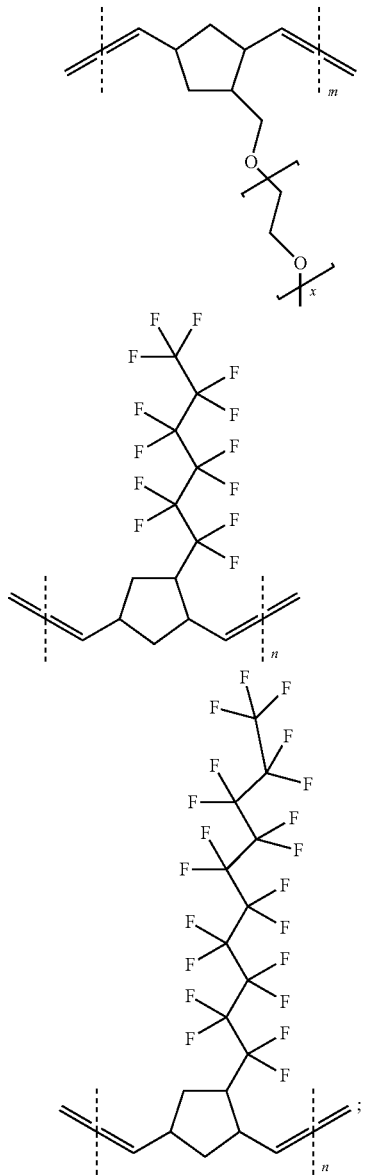

or wherein:
the copolymer is a block copolymer or a random copolymer;
x is 3 to about 10;
n and m, the number of repeat units B and A present in the copolymer, range from 1 to about 1000, provided the sum of n and m is equal to or greater than 10,
wherein the copolymer is optionally crosslinked.

2. The composite hydrophilic porous membrane of claim 1, wherein the copolymer has chain end groups selected from aryl groups and alkoxy groups.

3. The composite hydrophilic porous membrane of claim 1, wherein the copolymer is of one of the following formulae:

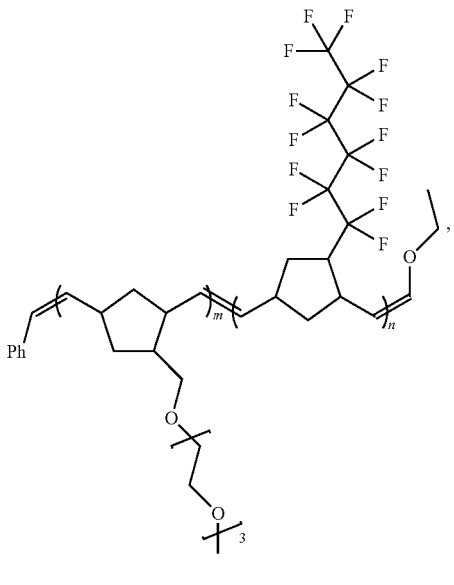

Poly(NTEG-b-NPF6)

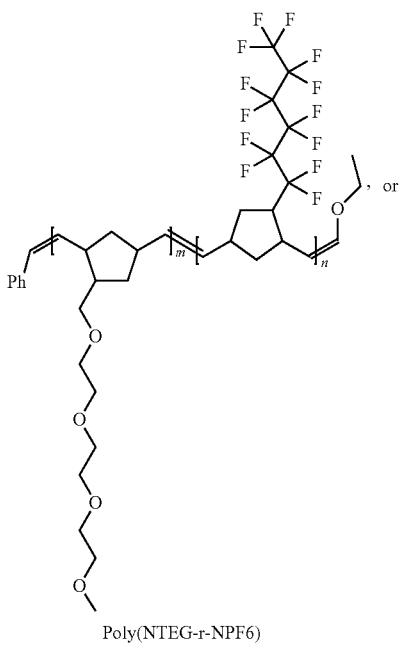

Poly(NTEG-r-NPF6)

-continued

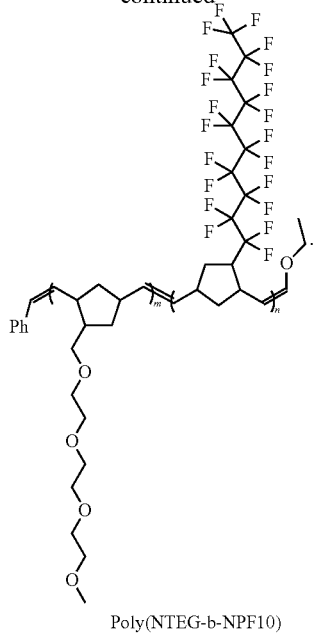

Poly(NTEG-b-NPF10)

-continued

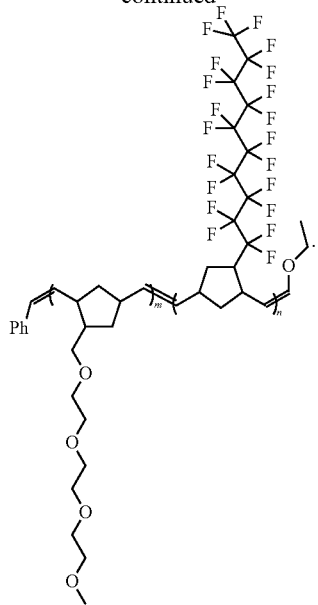

Poly(NTEG-b-NPF10)

4. The composite hydrophilic porous membrane of claim 3, which is a block copolymer of the formula:

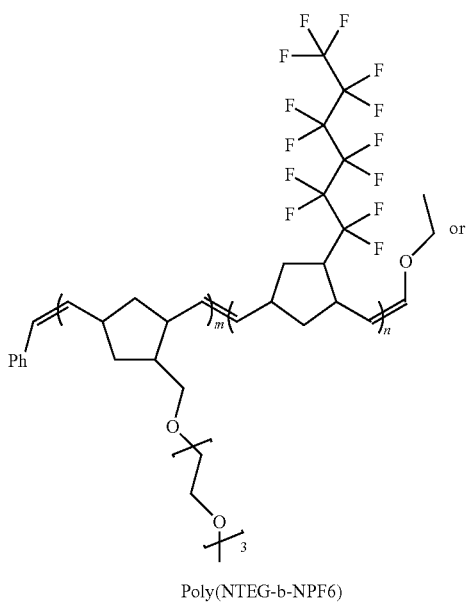

Poly(NTEG-b-NPF6)

5. The composite hydrophilic porous membrane of claim 3, which is a random copolymer of the formula:

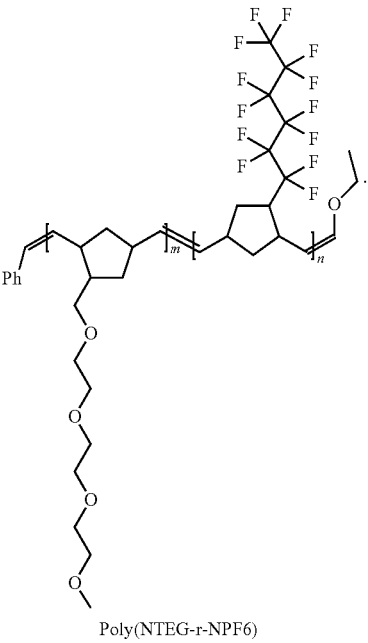

Poly(NTEG-r-NPF6)

6. A composite hydrophilic porous membrane comprising a porous fluoropolymer support and a coating comprising a copolymer, wherein the copolymer comprises repeat units A and B and one or more chelating or ion-exchange functionalities attached to one or more repeat units A, wherein A is of the formula:

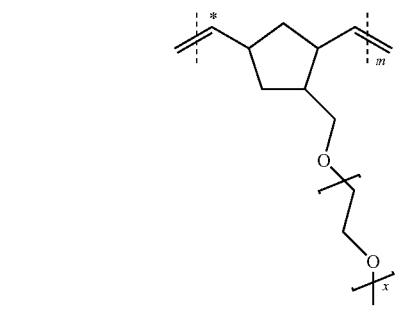

and B is of the formula

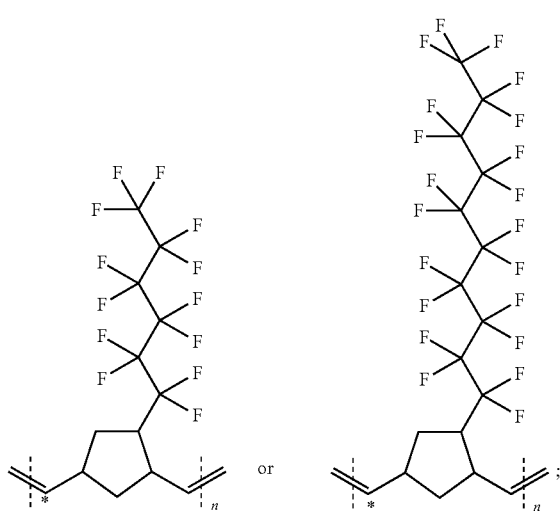

wherein:
* is the point of attachment of the chelating or ion-exchange functionality;
the copolymer is a block copolymer or a random copolymer;
x is 3 to about 10;
n and m, the number of repeat units B and A present in the copolymer, range from 1 to about 1000, provided the sum of n and m is equal to or greater than 10;
wherein the copolymer is optionally crosslinked.

7. The composite hydrophilic porous membrane of claim 6, wherein the copolymer has chain end groups selected from aryl groups and alkoxy groups.

8. The composite hydrophilic porous membrane of claim 6, wherein the chelating or the ion-exchange functionality is selected from carboxyl alkylthio, sulfonyl alkylthio, and glyceryl thio groups, and combinations thereof.

9. The composite hydrophilic porous membrane of claim 6, wherein the copolymer is of the formula:

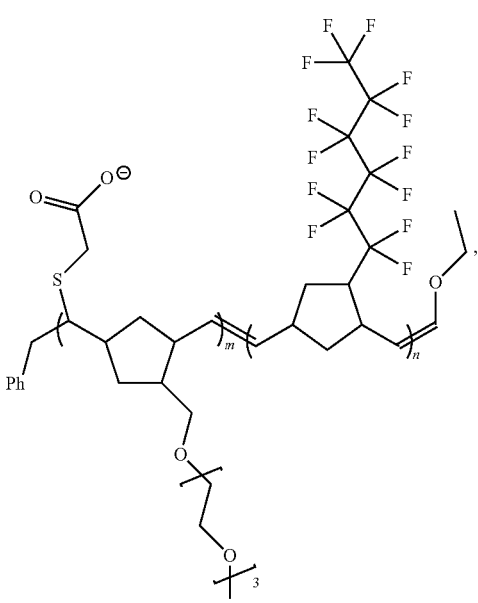

Poly(NTEG-b-NPF6)/MAcOH

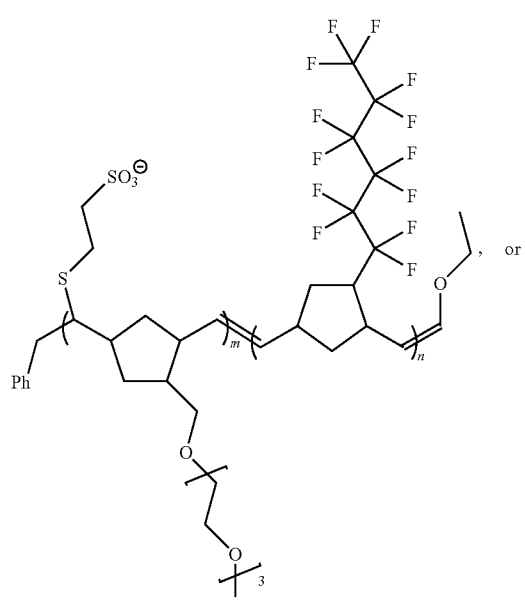

Poly(NTEG-b-NPF6)/MeSNa

-continued

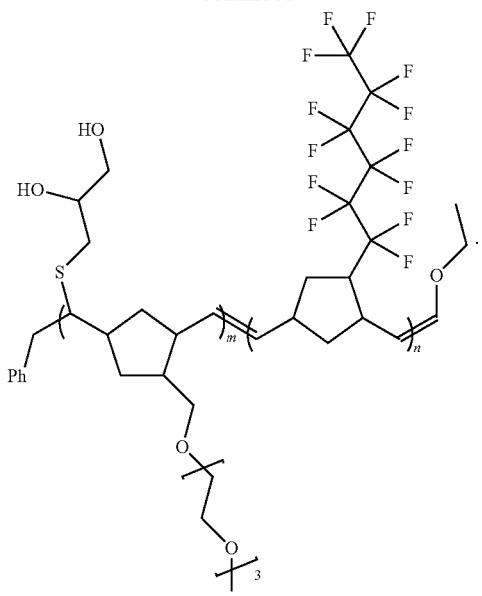

Poly(NTEG-b-NPF6)/Thiogylcerol

10. A method of hydrophilically modifying a porous fluoropolymer support comprising:
(i) providing a porous fluoropolymer support;
(ii) coating the porous fluoropolymer support with a solution comprising a solvent and a copolymer wherein the copolymer comprises repeat units A and B, wherein A is of the formula:

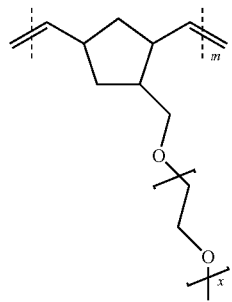

and B is of the formula

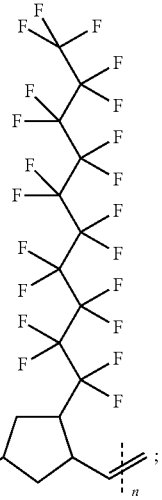

wherein:
the copolymer is a block copolymer or a random copolymer;
x is 3 to about 10;
n and m, the number of repeat units B and A present in the copolymer, range from 1 to about 1000, provided the sum of n and m is equal to or greater than 10,
(iii) drying the coated support from (ii) to remove at least some of the solvent from the solution comprising said copolymer; and optionally
(iv) crosslinking said copolymer present in the coated membrane.

11. The method of claim 10, wherein the copolymer is of the formula:

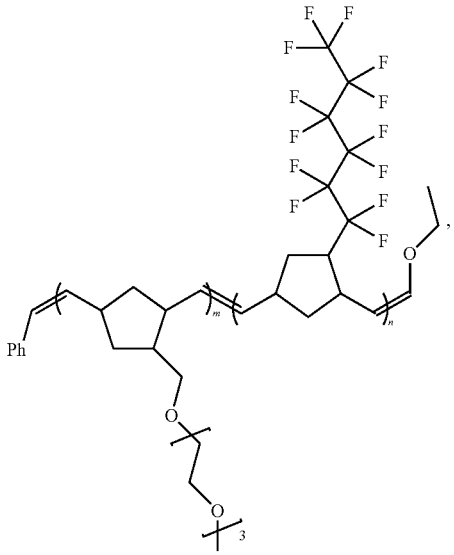

Poly(NTEG-b-NPF6)

-continued

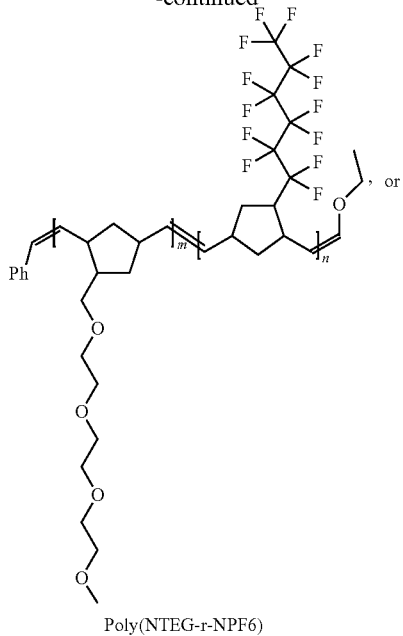

Poly(NTEG-r-NPF6)

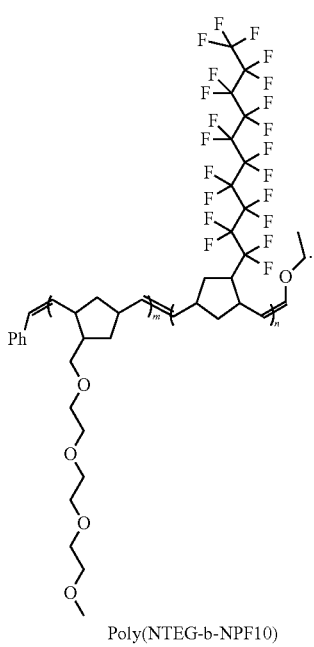

Poly(NTEG-b-NPF10)

12. A method of hydrophilically modifying a porous fluoropolymer support comprising:

(i) providing a porous fluoropolymer support;
(ii) coating the porous fluoropolymer support with a solution comprising a solvent and a copolymer wherein the copolymer comprises repeat units A and B, and one or more chelating or ion-exchange functionalities attached to one or more repeat units A, wherein A is of the formula:

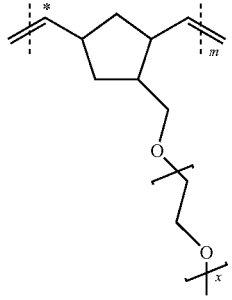

and B is of the formula

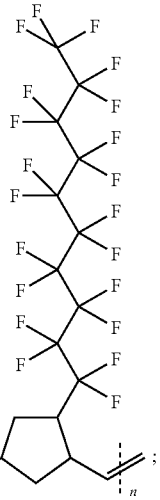

wherein:

* is the point of attachment of the chelating or ion-exchange functionality;

the copolymer is a block copolymer or a random copolymer;

x is 3 to about 10;

n and m, the number of repeat units B and A present in the copolymer, range from 1 to about 1000, provided the sum of n and m is equal to or greater than 10;

(iii) drying the coated support from (ii) to remove at least some of the solvent from the solution comprising said copolymer; and optionally (iv) crosslinking said copolymer present in the coated membrane.

13. The method of claim 12, wherein the copolymer is of the formula:

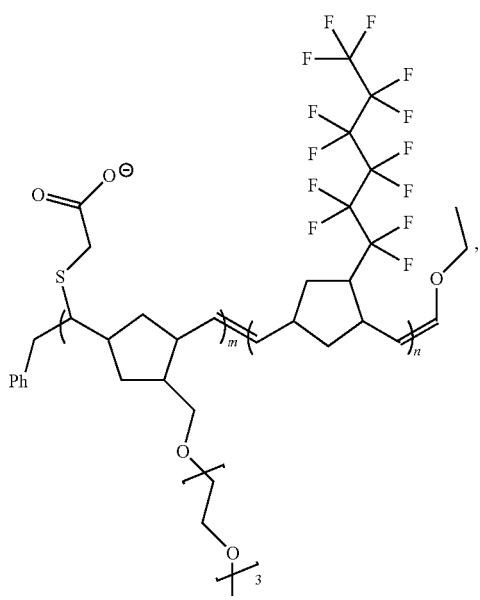

Poly(NTEG-b-NPF6)/MAcOH

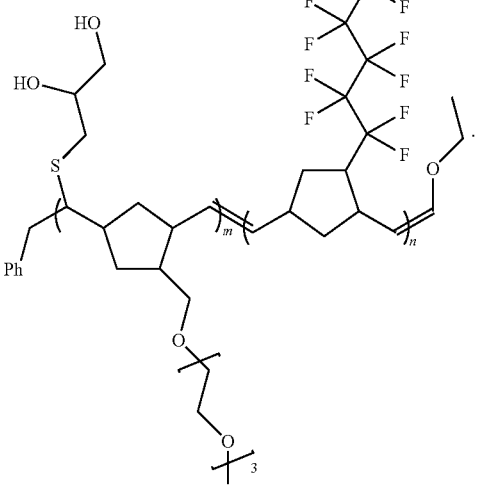

Poly(NTEG-b-NPF6)/Thiogylcerol

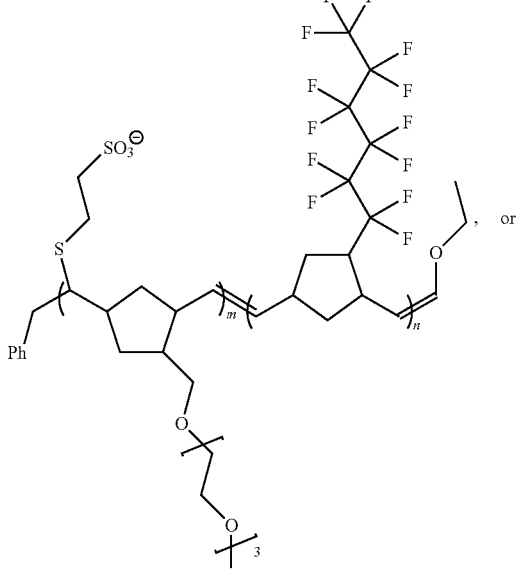

Poly(NTEG-b-NPF6)/MeSNa

, or

14. A hydrophilic porous membrane produced by the method of claim 10.

15. The composite hydrophilic porous membrane of claim 1, wherein the porous fluoropolymer support is selected from PTFE, PVDF, PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane.

16. A method of filtering a fluid, the method comprising passing the fluid through the hydrophilic porous membrane of claim 1.

17. The composite hydrophilic porous membrane of claim 1, which is configured in a planar, flat sheet, pleated, tubular, spiral, or hollow fiber configuration.

\* \* \* \* \*